US012798190B2

(12) United States Patent
Canga et al.

(10) Patent No.: US 12,798,190 B2
(45) Date of Patent: Nov. 17, 2026

(54) EYEWEAR LENS CREATION BY ADDITIVE MANUFACTURING USING IMPROVED LIGHT PATTERN TECHNIQUES

(71) Applicant: Indizen Optical Technologies S.L., Madrid (ES)

(72) Inventors: Ignacio Canga, Madrid (ES); Eduardo Pascual, Madrid (ES); José Alonso Fernández, Madrid (ES); Daniel Crespo Vázquez, Torrance, CA (US)

(73) Assignee: Indizen Optical Technologies S.L., Madrid (ES)

( * ) Notice: Subject to any disclaimer, the term of this patent is extended or adjusted under 35 U.S.C. 154(b) by 114 days.

(21) Appl. No.: 18/817,902

(22) Filed: Aug. 28, 2024

(65) Prior Publication Data

US 2026/0061701 A1 Mar. 5, 2026

(51) Int. Cl.

*B29C 64/264* (2017.01)
*B29C 64/106* (2017.01)
*B29L 11/00* (2006.01)
*G02B 1/04* (2006.01)

(52) U.S. Cl.

CPC .......... *B29C 64/264* (2017.08); *B29C 64/106* (2017.08); *B29L 2011/0016* (2013.01); *G02B 1/041* (2013.01)

(58) Field of Classification Search

CPC ................. B29C 64/264; B29C 64/106; B29L 2011/0016; G02B 1/041

See application file for complete search history.

(56) References Cited

U.S. PATENT DOCUMENTS 9,167,659 B2 * 10/2015 Coe-Sullivan ........ F21V 3/0625
2022/0118685 A1 * 4/2022 Pascual .................. B33Y 50/02
2022/0351936 A1 * 11/2022 Kaufmann .......... H01J 37/1474

FOREIGN PATENT DOCUMENTS

EP 3405330 A1 11/2018
EP 3642663 A1 4/2020
WO 2022082040 A1 4/2022

OTHER PUBLICATIONS

World Intellectual Property Organization, International Search Report and Written Opinion for International Application No. PCT/US2025/036691, Mail Date Oct. 30, 2025, 15 total pages.

* cited by examiner

*Primary Examiner* — Christina A Johnson
*Assistant Examiner* — Kelsey C Grace
(74) *Attorney, Agent, or Firm* — SoCal IP Law Group LLP; Angelo J. Gaz; Mark A. Goldstein

(57) ABSTRACT

A system includes a substrate partially transparent to a curing radiation having an improved light pattern; a photocurable resin on top of the substrate; and a spatial light modulator for illuminating the resin with curing radiation that passes through a diffuser and the substrate, then enters the resin. The improved light pattern is such that each point in the resin is illuminated by light from a set of points in the diffuser covering at least 10% of a surface of the diffuser. The improved light pattern may be improved and optimized to compensate for a distortion generated by the spatial light modulator, a distortion effect of using curved diffusers, a variability of the spatial response of the light modulator, or for a lack of linearity of the irradiance response of the spatial light modulator. Or the improved light pattern may change over time while projected onto the diffuser surface.

18 Claims, 20 Drawing Sheets

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL.

© 2024 INDIZEN OPTICAL TECHNOLOGIES, SL

530

© 2024 INDIZEN OPTICAL TECHNOLOGIES, SL

540

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2020 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

© 2024 INDIZEN OPTICAL TECHNOLOGIES, SL

EYEWEAR LENS CREATION BY ADDITIVE MANUFACTURING USING IMPROVED LIGHT PATTERN TECHNIQUES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to creation of ophthalmic lenses, and, in particular, to creating ophthalmic lenses using additive manufacturing technologies incorporating improved light patterns, such as patterns formed using better calibration techniques for space and/or temporal dynamic light patterns.

Description of the Related Art

The current technology for producing spectacle lenses is based on a cut and polish technology called "free-form". This process involves several machines: a blocker, generator, and polisher. These machines are expensive, bulky and require a great amount of expertise to maintain. In addition, this technology generates a lot of waste, and requires several consumables, some of them toxic. Also, this technology requires a large inventory of semi-finished lenses. It follows that setting up a free-form manufacturing facility requires a significant economic investment, a large workforce, and a large facility. This keeps lens manufacturing the domain of large companies.

With the advent of 3D printing, efforts have begun to implement lens creating using 3D printing technology. However, current 3D printing systems for lens creation are large in size and extremely expensive. Moreover, they are very slow, with a cycle time of 1 hour and maximum throughput of 4 lenses/hour. Other approaches based on variations of SLA (stereo-lithography) are less expensive, but still bulky and similarly slow.

One 3D printing technology used for lens creation is known as "resin-jet". It is based on layer-by-layer fabrication over a flat surface. The layers are composed of small UV-curable droplets that make the created surface smooth, which results in a surface with sufficient optical quality. However, there are large drawbacks with resin-jet technology. One drawback is manufacturing time. The reported printing time for one lens with resin-jet technology is roughly one hour. The process is slow because it stacks layers one by one. Further, the machine to implement resin-jet technology is large, with a big footprint. Plus, it is more expensive than the set blocker, generator, and polisher apparatus needed for "free-form" subtractive technology.

Another drawback of the resin-jet technology is that it only produces lenses with at least one flat surface. This is problematic because spectacle lenses usually have a curved or meniscus shape. One solution is to merge a convex-flat lens with a flat-concave lens, resulting in one meniscus-shaped lens. However, this requires two prints and the extra step of cementing the two half-lenses together, which is time consuming. Plus, the resulting lens is very thick.

To move lens making into the offices of eye care professionals and make lens creation available to small business, a simple, quick and inexpensive lens creation system with a small footprint is needed.

Figure 1A:
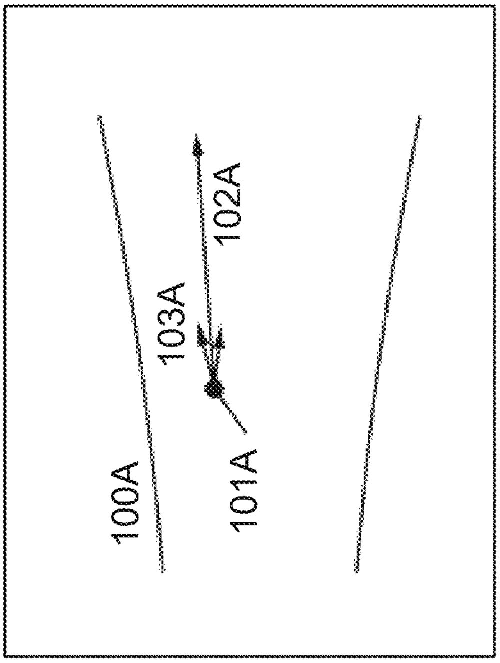
FIG. 1A is a drawing showing a directional light beam.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The methods, devices, systems and lenses described herein describe a system for the production of spectacle lenses using additive techniques and light passed through a diffuser according to creation instructions based on a wearer's prescription and usage requirements. They may include eyewear lens creation using improved light patterns, such a system or set of ways to improve the general volumetric printing process of a lens. They may include eyewear lens creation using substrates having a curved diffuser system, configuration, geometry and/or shape. The creation instructions include specification of an irradiation pattern which may be or include one or more improved light patterns. According to the systems and methods described herein, light patterns are generated by an illuminating system including at least a light source and a spatial light modulator (SLM). Illuminating systems may also include projection lenses or scanning systems. In the context of the present descriptions, a spatial light modulator is any device that can control the irradiance, phase, and/or polarization of light in a spatially varying manner, with the possibility of changing this spatial variation over time. Examples of illuminating systems using SLMs are Digital Light Processing projectors, using an LED or laser source, LCDs (liquid crystal displays) or DMDs (digital micromirror devices) and a projecting lens. The LCD can be transmissive or reflective. In some cases, the liquid crystal display is located at the image lane (or very close to it) and a projecting lens is not needed. A well-known alternative to LCDs are the LCOS displays (liquid crystal on silicon), that typically allow for higher power levels and high-definition images. Another type of illuminating system may consist of a laser beam which is deflected by means of acousto-optic cell modulators, or by scanning mirrors. The deflected beam is scanned over the image plane, and the irradiance at each point along the scanning path may be controlled by a modulation mechanism. Any of these illuminating systems incorporate means to produce, on a determined plane, a spatially varying irradiance distribution that can also change over time. As a short hand, this document will use the terms "light source incorporating a spatial light modulator" or simply a "spatial light modulator" to be the illuminating systems described above.

According to the systems and methods described herein, light is transmitted from the illuminating system incorporating a spatial light modulator through a diffuser into a container holding resin and a substrate. The light transmission is performed according to the irradiation pattern. Light reaching the diffuser is characterized by an irradiance distribution which may present spatial and time variation. It is also characterized by a total duration time t. The magnitude that will determine the successful creation of a lens with the techniques disclosed herein is Exposure, that is, the integral of irradiance at each point in the diffuser integrated over the total duration time. In short, we will name this Exposure as the irradiation pattern. In this disclosure we describe new methods to produce improved irradiation pattern that will better produce the desired Exposure. Any light source able to produce these irradiation patterns can be named a Spatial Light Modulator (SLM).

The irradiation pattern may be or include an improved light pattern that is a calibrated irradiance pattern, whether static or dynamic. The improved light pattern may be a temporal irradiance pattern to (e.g., calibrated to) avoid nonlinearities in the radiance responses of an ultraviolet light (UV) illuminating system. The irradiation pattern or improved light pattern includes instructions specifying that each point in the resin is illuminated by points of the diffuser inside a region whose area is at least 10% of the total area of the diffuser. An important aspect of the technology may be that each point within the resin receives light from an extended region of the diffuser, with an area at least 10%. A calibrated light pattern, radiance pattern, light pattern, irradiance pattern, irradiance distribution, irradiance, image, illumination, light source, spatial light modulator or other calibrated light herein may include or be or improved light pattern. A calibration described herein, such as a spatial calibration and/or irradiance calibration or calibrated spatial light modulator, may produce an improved light pattern.

In some embodiments, the diffuser has a curved front surface that is parallel to a curved back surface of the curved diffuser, and the front and back surfaces both have a curvature that is the same as or similar to a curvature of a front surface of the formed lens. Further, in some embodiments, a diameter of the diffuser is greater than or equal to a diameter of the substrate. in some cases, the diffuser is a curved diffuser. The diffuser should ideally follow the base curve of the lens, hence being curved most of the time. But if the lens requires a flat base curve, the diffuser should be flat. Also, it is possible to produce lenses with a shallow base curve using a totally flat diffuser. In some cases, the resin is contained on the substrate, such as using resin containment techniques or systems.

In some cases, a machine making lenses by additive manufacturing according to the descriptions herein, would handle a set of base curves defined as a finite set of curvatures for the front surface of the substrates the machine is ready to handle. Then, the machine would include a set of diffusers such that the number of diffusers in the set equals the number of different base-curve substrates. For example, if the machine is designed to handle substrates with base curves 0.5, 2, 4, 6 and 8, the machine then would have to be able to select diffusers with curvatures of 0.5, 2, 4, 6 and 8, so that for each lens, the curvatures of the substrate and the diffuser matches. In another embodiment, a flat diffuser can be used for substrates up to base 2, a diffuser with base curve 3 could be used for substrates with base curve 4 and 5, and a diffuser with base curve 6 could be used for substrates with base curve 6 and up to base curve 8. In general, it is preferable that the curvature of the diffuser is not far away from the curvature of the substrate, and this statement can be used as a design guidance for a manual or automatic machine that produce lenses by additive methods as described here.

The methods and systems described herein describe a system for the production of spectacle lenses that is simpler than the current "free-form" technology. The system described herein is lightweight, has limited movable pieces, results in less waste than "free-form" production and requires a highly reduced use of consumables when compared to "free-form" production. This results in less expensive systems that will enable smaller enterprises, including opticians, to enter the business of producing spectacle lenses.

Figure 1B:
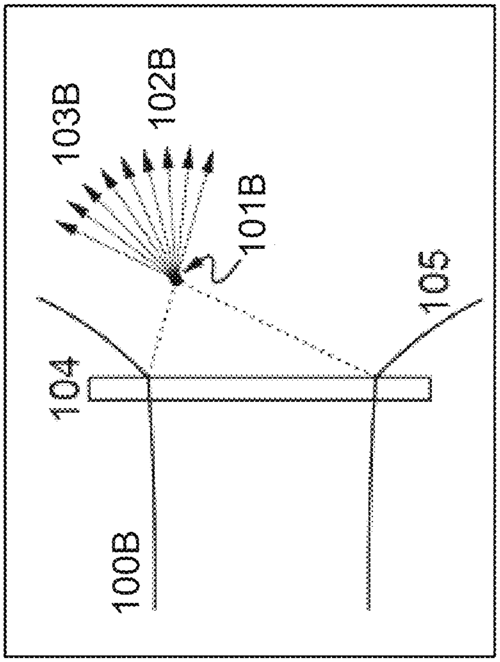
FIG. 1B is a drawing showing a non-directional light beam.

To better understand the systems and methods described herein, an understanding of directional and non-directional light beams is helpful. FIGS. 1A and 1B provide a comparison between directional and non-directional light beams. A directional light beam is a beam of light for which radiance, at any point in the beam, has non-negligible values within a narrow solid angle around a single direction. Examples of directional light beams are collimated beams, or spherical beams coming from a point source. A non-directional (or diffuse) light beam is a beam of light for which radiance, at any point in the beam, has non-negligible values for a finite range of directions. According to the systems and methods described herein, nondirectional beams result from light passing through a light diffuser.

Referring now to FIG. 1A, a directional light beam (100A) is shown. For any point (101A) within a directional light beam (100A), radiance is non-negligible along a single direction (102A). In close directions (103A) radiance goes to zero or very low values, and is zero for any other direction. Referring now to FIG. 1B, if a directional light beam (100B) passes through a light diffuser (104) the directional light beam becomes non-directional or diffuse (shown as 105), and it is characterized by having non-negligible radiance at a significant set of directions (102B), (103B) for any point within the diffuse light beam (101B). The systems and methods described herein include a diffuser to guide light to cause a polymerization reaction in resin to produce eyeglass lenses.

Polymerization of Photocurable Resins

Photopolymerization is a type of polymerization in which light is used to initiate the polymerization reaction. It has two routes, free-radical and ionic. Most examples in this disclosure are based on free-radical polymerization, but ionic polymerization can be used as well. The reaction is triggered by a photosensitive component called the initiator, which is mixed within the liquid monomer. Typically, the light wavelength is in the ultraviolet range (such as, for example, UV-A or actinic UV), although some initiators can be activated with visible light or other wavelengths. In some embodiments, the initiator has an absorption band covering from 360 nm to 390 nm.

As used herein, the term "resin" refers to a mixture including a monomer base, an initiator and, in some embodiments, an inhibitor. That is, an inhibitor is optional. The resin is in a liquid state and may include other components, such as stabilizers, photoabsorbers, etc. Example resin bases include acrylate, epoxy, methacrylate, isocyanate, polythiol, thioacrylate, thiomethacrylate. Example acrylate resins include pentaerythritol tetraacrylate; 1,10-decanediol diacrylate; and others. The initiators may be free-radical or cationic. When using free-radical polymerization, example initiators include benzophenone, BAPO (bisacylphosphine oxides), acetophenone, 1-[4-(2-Hydroxyethoxy)-phenyl]-2-hydroxy-2-methyl-1-propane-1-one (Irgacure 2959(c) from CIBA), alpha amino ketones, HAP (2-Hydroxy-2-methyl-1-phenyl-propan-1-one) and TPO (Diphenyl(2,4,6-trimethylbenzoyl)phosphine oxide), and others. When using a cationic photo-initiator, example initiators are aryldiazonium salts, triarylsulfonium salts, ferrocenium salts, diaryliodonium salts, and others. An example inhibitor is hydroquinone.

When the initiator molecule absorbs an UV photon, the molecule is divided into free-radicals that react with the monomer. The result of this reaction is a monomer attached to a free-radical, which subsequently reacts with more monomer molecules and creates a polymer with growing molecular weight. The reaction finishes when the free-radical chain end is neutralized, which typically may happen by termination or by chain transfer to an inhibitor.

The reactions that occur during polymerization are dissociation, initiation, propagation, termination and chain transfer to an inhibitor, as represented by the following equations:

$$\text{Dissociation: } [A] + I_{abs} \xrightarrow{k_d} 2[R\cdot] \tag{1}$$

$$\text{Initiation: } [R\cdot] + [M] \xrightarrow{k_i} [M\cdot]_1$$

-continued $$\text{Propagation: } [M\cdot]_n + [M] \xrightarrow{k_p} [M\cdot]_{n+1}$$

$$\text{Termination: } [M\cdot]_n + [M\cdot]_m \xrightarrow{k_t} [M]_{n+m}$$

$$\text{Chain transfer to an inhibitor: } [M\cdot]_n + [Z] \xrightarrow{k_z} [M_nZ]$$

Here [A] is the initiator concentration, [R•] is the free-radicals concentration, [M] is the monomer concentration, $[M\bullet]_i$ is an active (with attached free-radical) polymer composed of i monomers, $[M]_i$ is a stable polymer composed of i monomers, [Z] is the concentration of a particular inhibitor that may be present and $[M_nZ]$ is the concentration of polymer that reacted with the inhibitor. Parameters $k_d$, $k_i$, $k_p$, $k_t$, and $k_z$ are the kinetic constants for each reaction. $I_{abs}$ is the amount of UV radiation energy absorbed by the initiator.

These reactions are generally solved under the assumption of steady state, where the free radicals generated by the dissociation of the photoinitiator are consumed by polymerization termination (both recombination and inhibition). The rate of change of the monomer concentration is given by the following equation:

$$\frac{d[M]}{dt} = -k_p[M]\frac{[Z]k_z - \sqrt{[Z]^2k_z^2 + 16\phi I_{abs}k_t}}{4k_t} \tag{2}$$

In this formula, the inhibitor concentration [Z] might depend on time. The variable ϕ indicates the initiator quantum efficiency. Also, $k_z$, $k_t$ and $k_p$ depend on the temperature through the Arrhenius relation. For example, for $k_p$ $$k_p = k_{po}e^{-\frac{E_p}{RT}}, \tag{3}$$

where $k_{po}$ is a constant, $E_p$ is the energy involved in the propagation reaction and R is the gas constant. Because the polymer propagation reaction is exothermic, it is expected the kinetic constants change over time.

Solving the differential equation (2) requires numerical integration algorithms, but under some approximations, analytic solutions illustrate the methods described herein. In a applying the methods described herein, numerical solutions to equation (2) can be used, and depending on the required accuracy, approximate analytical solutions can also be used. When there is no inhibitor and the temperature is constant, the monomer concentration over time is given by the following equation:

$$[M](t) = [M_0]e^{-k_pt\sqrt{\frac{\phi I_{abs}}{k_t}}}, \tag{4}$$

where $M_0$ is the initial monomer concentration. The polymer created at the same time as the monomer is consumed during polymerization. The degree of conversion c is the proportion of monomer converted into polymer shown by the equation:

$$c = \frac{[M](t) - [M_0]}{[M_0]} \tag{5}$$

When the conversion rate increases, the viscosity of the media increases. When the conversion reaches a certain point called the critical conversion $c_{cr}$, the viscosity increases exponentially, and the mixture solidifies due to the low mobility of the large polymer molecules and/or high density of crosslinks between polymer chains.

When directional light is applied to the photocurable resin, the irradiance absorbed per unit length by the initiator after propagation through a depth z in the resin, is obtained from the Lambert-Beer law according to this equation:

$$I_{abs} = [A]I_0\alpha e^{-[A]\alpha z-\gamma z}. \tag{6}$$

Here α is the molar absorption coefficient of the initiator, z is the depth inside the material, γ is the absorption coefficient of the resin without the initiator and $I_0$ the input intensity. As such, the absorption is maximum at the beginning of the material and decays exponentially inside.

Figure 2A:
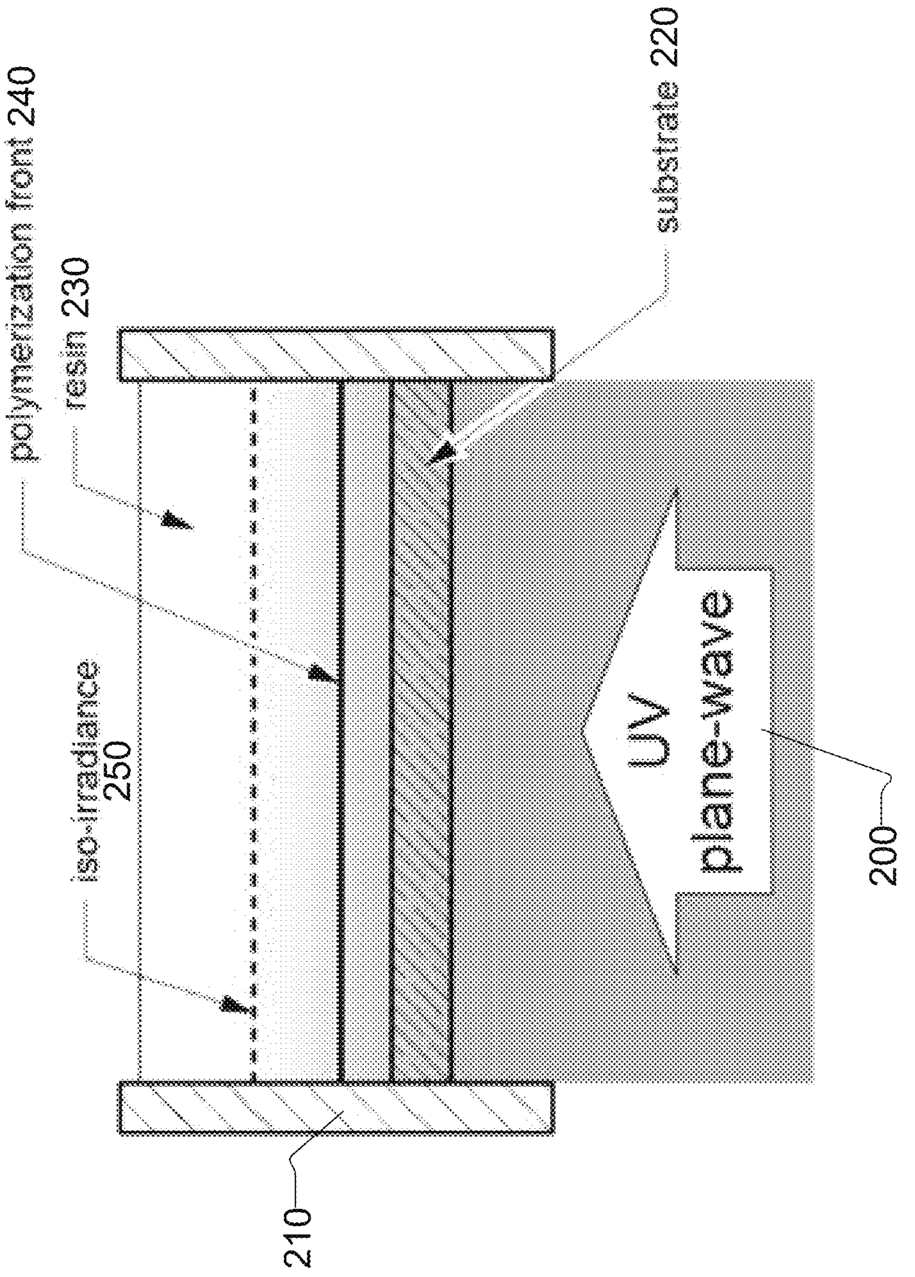
FIG. 2A is a drawing showing light propagation within resin.

When a resin in a container is irradiated with directional light, the polymerization rate is faster closer to the material interface and will decay exponentially inside the material. At a given time a certain part of the material will reach the critical conversion as depicted in FIG. 2A. All material below this point will be a solid and all material above it will be a liquid. We call this frontier the "polymerization front" shown as 240. Referring now to FIG. 2A, plane wave light 200 propagation passing through a transparent substrate 220 inside a container 210 holding resin 230 is shown. The dashed line 250 represents surfaces with the same irradiance.

During light exposure, the polymerization front propagates with logarithmic speed inside the resin 230. When the exposure is stopped, a layer whose thickness depends on exposure time results. The thickness of the cured material is given by the equation:

$$T(t) = \frac{1}{[A]\alpha}\ln\left(\frac{[A]I_0\alpha k_p^2\phi t^2}{k_t\ln(1-c_{cr})^2}\right) \tag{7}$$

This equation (7) can only be applied with directional light when all parameters are constant with time.

Figure 2B:
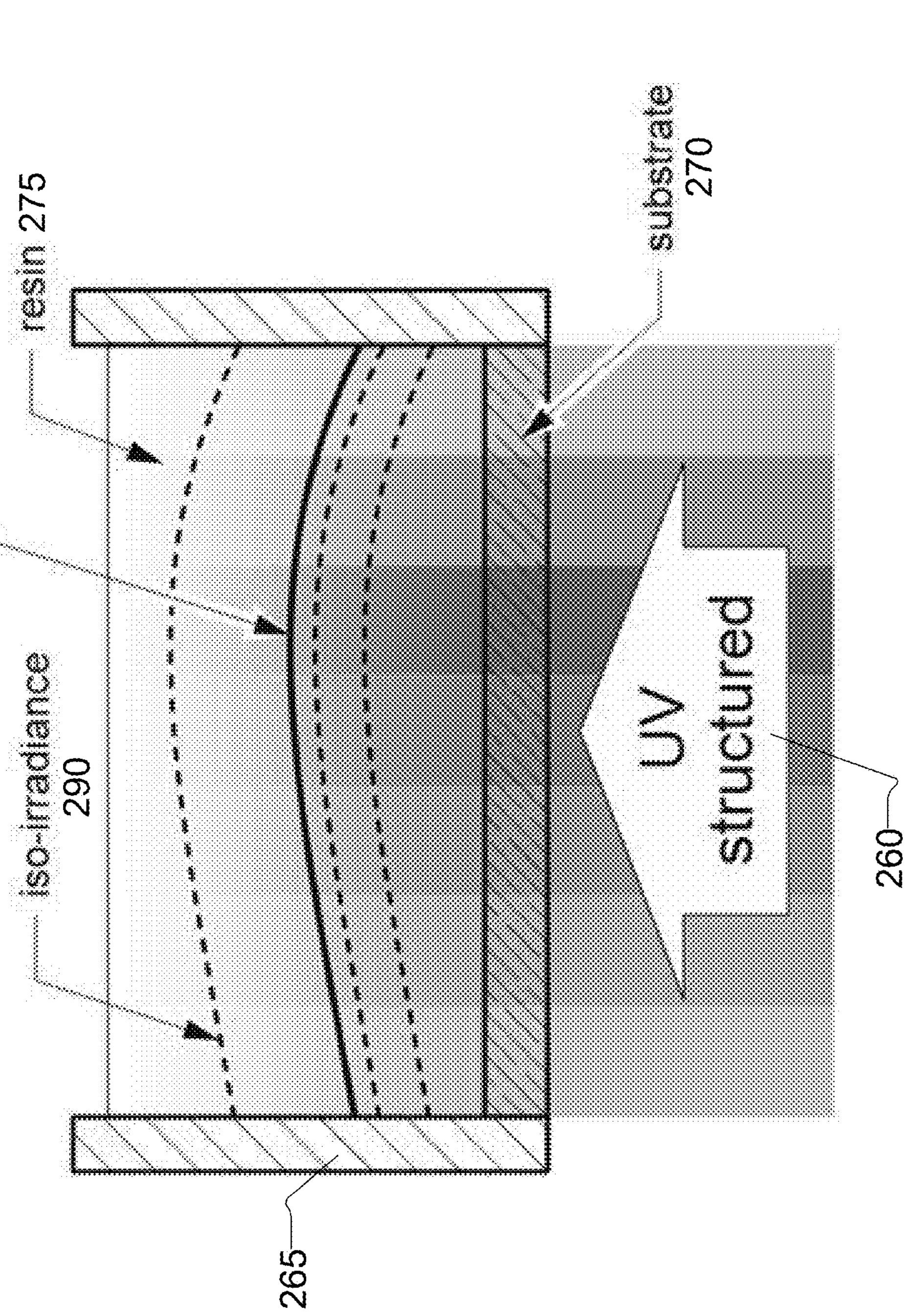
FIG. 2B is a drawing showing propagation of patterned light within resin.

When the projected light is patterned, the shape of the polymerization front follows the radiance pattern, as shown in FIG. 2B. FIG. 2B shows the patterned light 260 propagation through the resin 275 in a container 265. FIG. 2B shows light 260 propagation passing through a transparent substrate 270 inside the container 265. Here, the light is directional but presents a transverse distribution which modifies the shape of the polymerization front 280 as well as the shape of the surfaces with same irradiance 290.

When the combination of exposure time and input UV irradiance pattern are correctly calibrated, the shape of the polymerization front can be controlled according to equation (7) and more precisely by numerical integration of equation (2). This technique can be used to make a variety of three-dimensional objects. However, the resulting three-dimensional objects typically lack transparency and optical quality because of self-focusing, as explained below. For this reason, this technique alone, which uses directional light, is not enough to make spectacle lenses.

As used herein, "spectacle lens" refers to any type of eyewear that is worn a small distance from the wearer's eye. Spectacle lenses can include: spherotorical lenses, aspherical lenses, progressive addition lenses, bifocals, trifocals, lenticulars, slab offs, etc. The typical spectacle lenses made may be from 40 to 80 mm in diameter and have a thickness of from 2 to 8 mm. The systems and methods described herein may also be used to make larger and smaller lenses, as well as thinner and thicker lenses.

The systems, devices, lenses and methods described herein are used to create spectacle lenses which may have fixed surfaces or free-form surfaces using diffuser techniques or systems. For a fixed surface lens, the lens is produced from resin that adheres to the substrate. As shown in FIGS. 2A and 2B, the fixed surface of the substrates 220 and 270 are flat (e.g., in the up/down or Z direction), but the substrate surfaces can have any shape. The most convenient substrate shape (e.g., in the lateral or X,Y directions) for spectacle lenses is a spherical surface. However, more complex substrate surfaces can be used, such as aspherical, torical, atorical, multifocal, etc. In some embodiments, electronic circuits or image formation systems can be embedded inside the substrate. In other embodiments, the substrate is constructed or augmented to allow for the production of lenses with large edge thickness, such as for negative lenses. In one such embodiment, the substrate may be aspherized, lenticularized toward the edge to increase the amount of resin that can be held. In another such embodiment, a cylindrical wall is attached to the substrate edge to increase the amount of resin that can be held. The substrate can be made of polycarbonate, allyl diglycol carbonate, polyurethane-based plastic, glass, or similar materials, and may be CR-39® or TRIVEX® available from PPG Industries Ohio, Inc. of Cleveland, Ohio.

In the embodiments described herein, the fixed surface represents the surface that is farthest from the eye. In other embodiments, the order can be reversed such that the fixed surface represents the surface that is closest to the eye. The free-form surface is the surface determined by the location of the polymerization front. In the following embodiments, the free-form surface is the surface closest to the eye.

Self-Focusing

Figure 3:
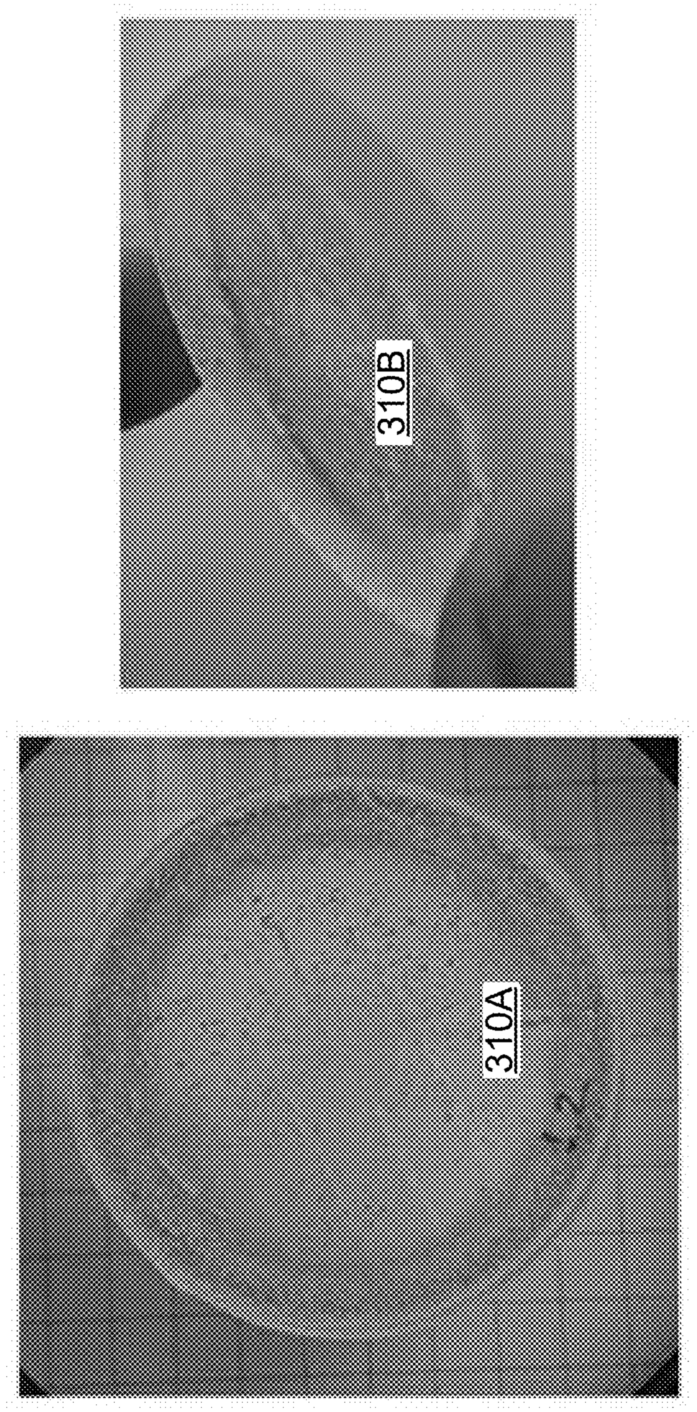
FIG. 3 are photographs of a lens created with directional light.

As described above, a directional light beam with adequate distribution of irradiance may be used to create a controlled polymerization front in resin, so the shape of the free-form surface provides the desired spectacle lens. However, directional light beams are prone to create strong defects in the polymerized materials because of what is known as the self-focusing effect. The refractive index of the polymer is typically slightly larger than the refractive index of the liquid resin. Any minute deviation of the local value of the irradiance impinging on the liquid resin, (the deviation can be present on the profile as noise, which is inevitable in directional light, can be due to dust particles or defects on the transparent surfaces holding the resin, and can result from the pixel structure of the projector) will cause a local variation of the refractive index that in turn will locally focus the irradiance. This creates a positive feedback loop that produces a distinctive defect, typically in the form of the shape of a needle oriented along the direction of propagation of the radiance. As a result, the generated polymer loses transparency, and the free-form surface becomes spiky such that the resulting object has no or poor optical quality. This is shown in the images of a lens created with directional light in FIG. 3 in which 310A is a top view and 310B is a perspective view. To overcome this, the methods and systems described herein use diffused light instead of directed light.

Light Diffuser

When a light diffuser is placed between a light projector and resin, the light from each radiant pixel is scattered into multiple angles such that the light does not follow the initial direction from the projector. (See the discussion of FIGS. 1A and 1B above.) To implement the methods described herein, it is preferable to have a diffuser with properties as close to conforming to Lambert's cosine law as possible. As described below, the properties of the diffuser are evaluated to measure how close to the ideal/Lambertian the diffuser is using a bidirectional transmission distribution function (BTDF). For an ideal diffuser, the radiance follows Lambert's cosine law. Measurements using BTDF are taken to evaluate the properties of the diffuser. The diffuser is made from light diffusing materials which include glass and polymers manufactured with light diffusing additives. More specifically, the diffuser may be made from opal glass, white glass, acrylate sheets with calcium carbonate additives, and others. In one embodiment, an example light diffuser is an acrylate sheet that is 2 mm thick and is made with 3.3 wt % $CaCO_3$ additive. We will call this diffuser, which is critical to the creation of a smooth polymerization front, volumetric-printing diffuser. This name should differentiate it from other diffusers that could be present in the light sources, or in other components of the equipment necessary for the whole volumetric printing process.

Figure 4:
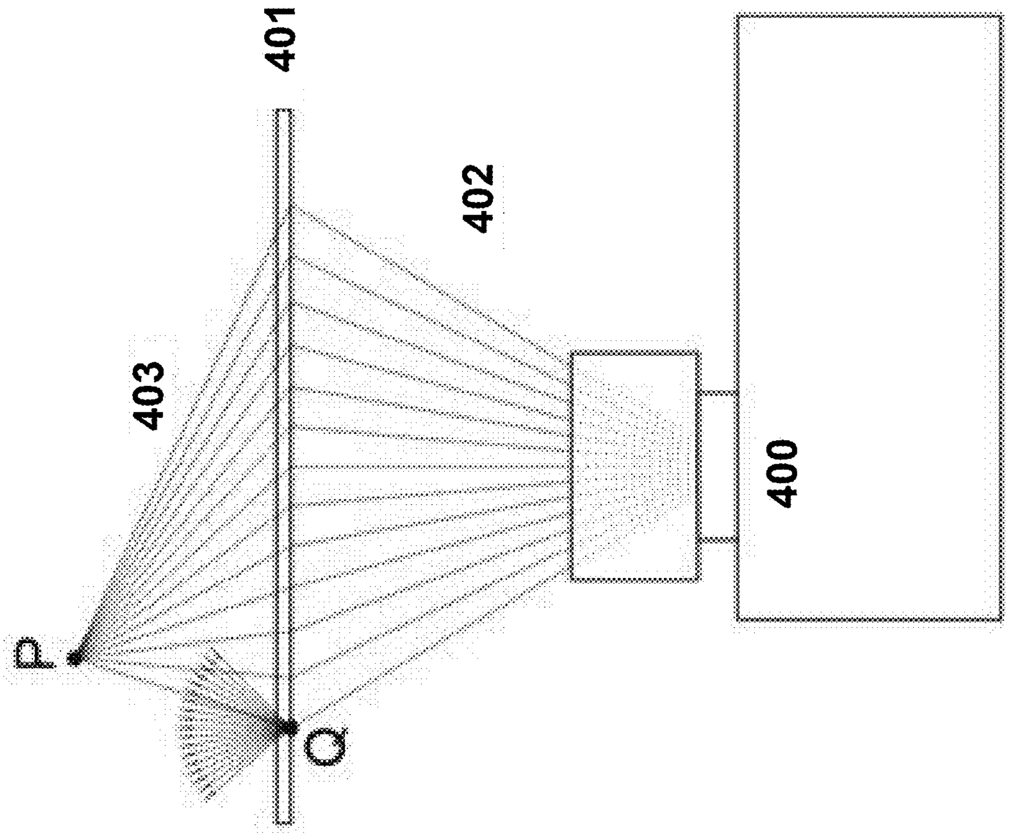
FIG. 4 is a drawing showing the effect of a light diffuser on directional light.

Referring now to FIG. 4, there is shown a schematic drawing showing the impact of light diffuser 401 on light 402. The light source 400 sends radiant energy (that is, light) 402 toward diffuser 401. The light source 400 may be, for example, an ultraviolet Digital Light Processing (UV DLP) projector, a scanned UV laser, a spatial light modulator or an illuminating system. For example, the projector 400 may emit radiation (that is, UV light) with a peak at 385 nanometers (nm). The light emitted 402 by the source is highly directional. The diffuser 401 scatters light in all directions, so any point Q on the diffuser will emit light in all directions. The radiance of the scattered light is dependent on the bidirectional transmission distribution function of the diffuser. Hence, the flux reaching any point P behind the diffuser has contributions 403 from multiple points on the diffuser.

According to the systems and methods described herein, the diffuser is located inside and preferably at the bottom of a container, vat or chamber of resin. When the diffuser is located at the bottom of a container filled with resin, every point within the resin receives light from multiple points on the diffuser and from multiple directions. In one embodiment, each point in the resin receives light from at least 10% of the diffuser area. As such, the light transmitted from the diffuser to and through the resin is not directional, eliminating the self-focusing problem described above. To achieve this—that is, so that every point in the resin receives light from multiple source locations on at least 10% of the diffuser—a substantial part of the diffuser is illuminated. Specifically, in some embodiments, at least 15% of the diffuser area is illuminated by an illuminating system including a spatial light modulator. If this does not occur, the self-focusing will remain or not be fully removed. Using the method of at least 15% illumination of the diffuser to illuminate each point in the resin with at least 10% of the light from the diffuser results in a polymerized lens with a free-form surface this is smooth, transparent and having low haze. The resulting lens has good optical quality. An advantage of this technique is that the system is tolerant to dust, dirt or any imperfections in the projector or the media between the projector and the resin container.

Controlling the Shape of the Polymerization Front

To create desired eyeglass lenses, the shape of the polymerization front must be controlled. A precise model of the polymerization inside a container of resin takes into consideration each of the following:

Irradiance propagation from the diffuser to the substrate and into the lens.

Temporal evolution of polymer, initiator, and inhibitor concentration.

Heat diffusion and temporal evolution of temperature.

Monomer, initiator, and inhibitor diffusion.

Bidirectional transmission distribution function (BTDF) of the light diffuser.

When using diffuse light, equation (7) no longer applies. Also, equation (3) cannot be applied when parameters such as reaction rates, initiator, or inhibitor concentrations changes over time. Therefore, a careful modeling of the reactions (1) is needed when using diffuse light.

The desired shape of the free-form lens surface may be referred to as $z_L(x,y)$. The differential equations corresponding to equations (1) are numerically solved for a given input irradiance pattern I to obtain the polymerization front $z_p(x, y,I)$. For a fixed set of control points $(x_i,y_i)$ the following merit function or equation (8) is computed:

$$M(I) = \sum_i w_i[z_P(x_i, y_i, I) - z_L(x_i, y_i)]^2 \tag{8}$$

The merit function is minimized with respect to the parameters defining the input irradiance pattern or "input pattern" for short. When the light source is a DLP projector (e.g., which may include a spatial light modulator), the irradiance pattern impinging on the diffuser is defined pixel-wise and is represented as a matrix $I_{nm}$, where the indices n and m run over the rows and columns of the digital image. In some cases, i may run from i=1 to i=n where n is the proper integer required to cover the size of the desired shape of the free-form lens surface. Other merit functions may be used, such as the sum of the differences between the curvatures of the target (the free form surface) and the polymerization front.

The previous paragraphs have explained how to compute the irradiance distribution I(x,y) that, upon impinging on the diffuser, will produce the polymerization front $z_p(x,y)$ to match the target lens surface $z_L(x,y)$ after an irradiance time t. This irradiance distribution is to be created by means of an adequate illuminating system including a spatial light modulator. It is possible to classify the light sources that can produce a controlled irradiance distribution into two types: pixelated sources and beam-scan sources.

Pixelated Sources

Figure 5A:
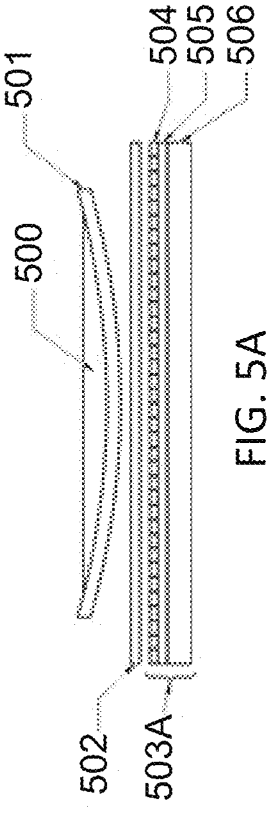
FIGS. 5A-5C show examples of different types of pixelated light sources.
Figure 5B:
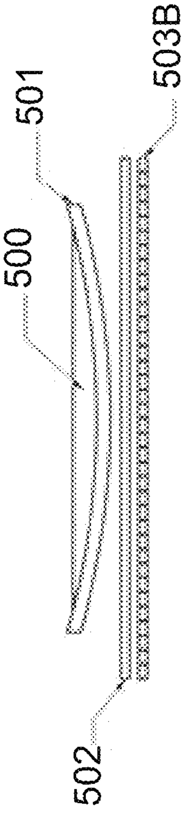
Figure 5C:
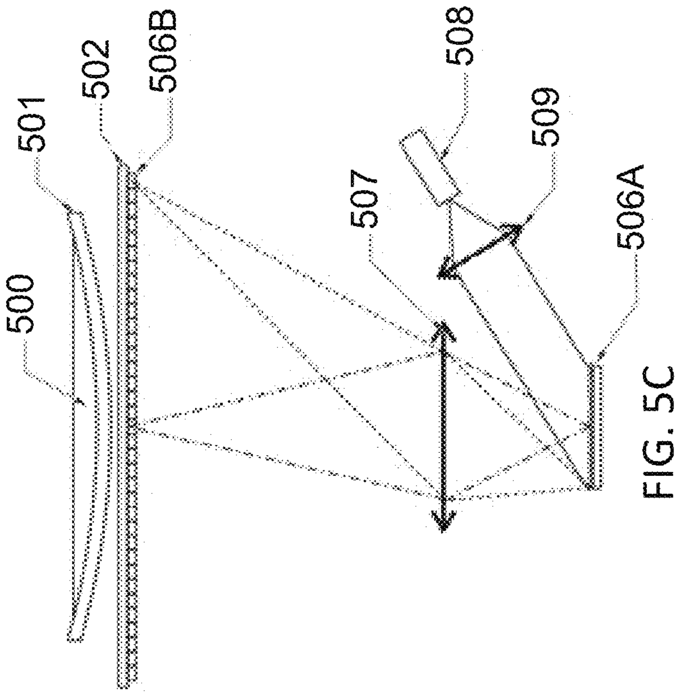

For pixelated sources, the region to be illuminated is divided into pixels, and irradiance can be independently controlled within each pixel. Examples of pixelated light sources such as spatial light modulators or illuminating systems are shown in FIGS. 5A-5C. In FIG. 5A the substrate 501 and the resin 500 it contains, are illuminated from the volumetric-printing diffuser 502, which in turn is illuminated by a flat-panel display 503A. Here, display 503A may be considered the pixelated light source of FIG. 5A. Substrate 501 and resin 500 may be a substrate and resin as mentioned herein. There are different types of flat panel displays 503A that could be used. For example, it could be a transmissive liquid crystal display (LCD) 504 that is illuminated from below by a light source 506 with the possible intermediation of a diffuser 505, as shown in FIG. 5A. This light source can be located close to the LCD, or separated from it, as in modern stereolithography-type 3D printers using LCDs. Another approach is shown in FIG. 5B, where the matrix display 503B is active and includes organic light-emitting diodes (OLEDs) or micro LEDs. Here, display 503B may be considered the pixelated light source of FIG. 5B. This way each pixel is an emitter that can be independently controlled. The advantage of pixelated sources shown in FIGS. 5A-5B is that the spatial location of the pixels and their size is very precise and stable, as the displays and their pixels are made using the high precision lithographic processes used in the electronic industry. The limitation of these types of light sources is the relatively low maximum irradiance that they can deliver, which in turn limits the concentration and types of photo initiators and resins that can be used in the volumetric printing process. Sources of the type shown in FIG. 5B may also be limited in the wavelengths that can be used, especially near the UV region, which, once again, imposes a limitation on the types of photo-initiator and resins that can be used in the process. The advantages of sources like those shown in FIGS. 5A-5B are its compactness and the accuracy and stability of the pixel layout. Another type of pixelated light source is shown in FIG. 5C, in which case a digital light projector (DLP) is used. A light source 508 with adequate power and wavelength, is projected, by means of an optical system 509, onto a spatial modulation system that is formed by or that includes an active matrix of pixels 506A. Examples of spatial modulation systems are digital micro-mirror devices (DMD), and the light from source 508 is reflected by the micromirrors (e.g., of pixels 506A), which act as secondary light sources for the optical projection system 507. Other DLPs use transmissive LCDs, or reflective liquid crystal on silicon (LCOS) displays. The optical system 507 images the pixels of the spatial modulator onto the image 506B. The irradiance of this image may be the one obtained by the optimization of a merit function such as the merit function given in equation (8). Here, features 508, 509, 506A, 507 and 506B replace the pixelated light source of FIG. 5C. In some cases, image 506A or physical spatial modulator 506B may be considered the pixelated light source of FIG. 5C.

FIG. 5C may show a schematic representation of a DLP made of the light source 508, the optics of the light source, 509, the spatial modulator 506A (typically a DMD device) and the projection optics 507. An actual DLP may also have the driving electronics which are not represented in FIG. 5C. It is possible that modulator 506B is not an actual object, but represents the pixelated image that 507 forms on the diffuser bottom surface.

Pixelated light sources as shown in FIGS. 5A-5C need a calibration process. When the spatial modulator is not projected but is in contact with or very close to the volumetric-printing diffuser (e.g., diffuser 502 of FIGS. 5A-5B), spatial calibration is not needed, but irradiance calibration is needed. Digital light projectors will in general require both spatial and irradiance calibration. Spatial calibrations are necessary in these systems as the projecting lens 507 may have aberrations that distort the location of the imaged pixels. There are different methods to compensate for distortion in DLPs.

Spatial Calibration

Figure 5D:
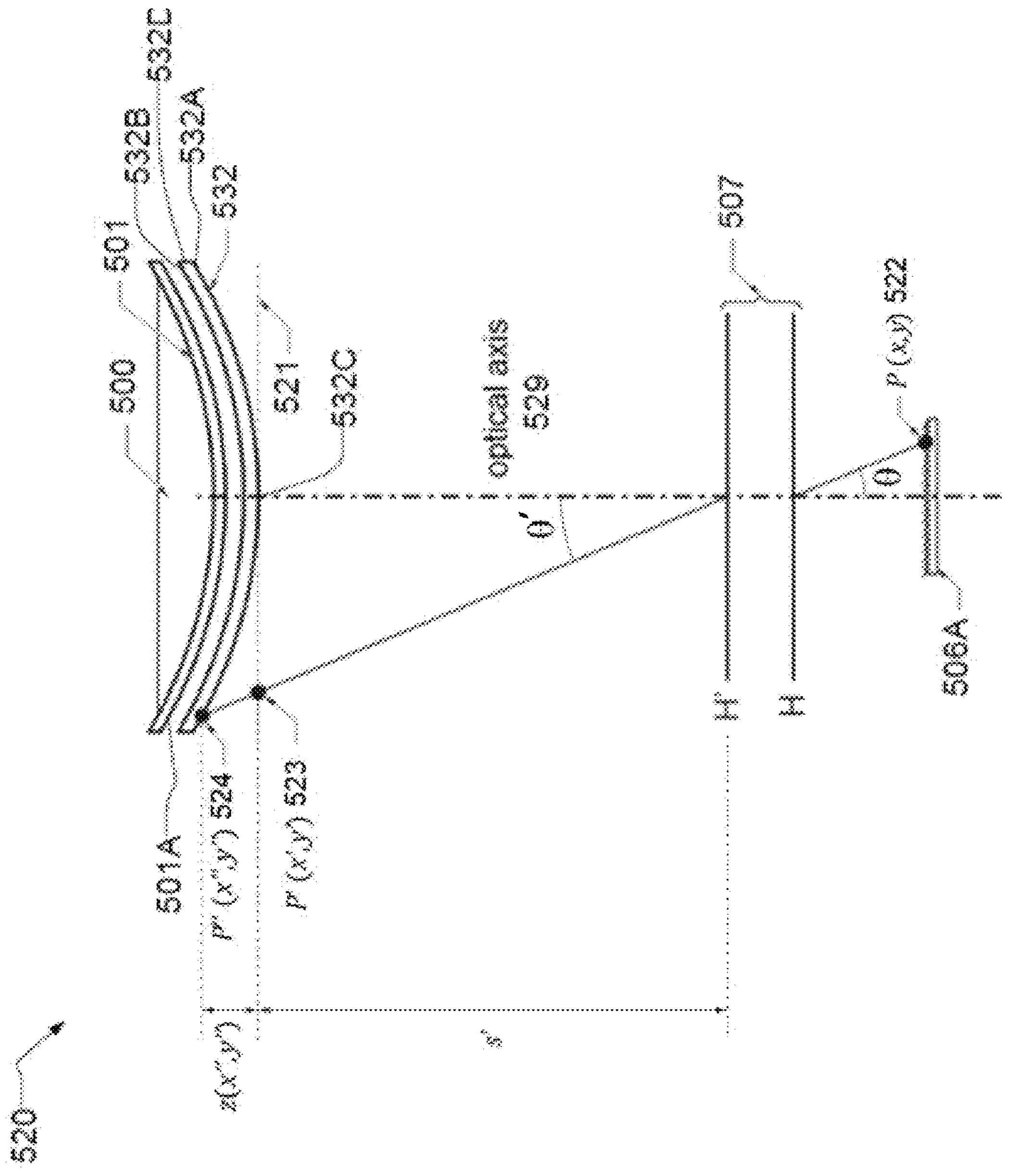
FIG. 5D shows a schematic of the optical setup for spatial calibration of a light source having improved light patterns employed in the volumetric-printing process.

However, in a set of embodiments of the volumetric printing process, a novel spatial calibration process may be required. These volumetric printing embodiments may include systems, devices, lenses and methods used to create spectacle lenses using diffuser techniques with improved light pattern techniques. FIG. 5D shows schematic 520 of the optical setup for spatial calibration of a light source when improved light patterns are, or are to be, employed in the volumetric-printing process. Schematic 520 may show the optical system of a DLP (e.g., as or including pixels 506A and optical projection system 507) irradiating a curved diffuser 532.

In some cases, FIG. 5D shows schematic 520 of an optical setup for using improved light patterns techniques with curved diffusers 532 in a volumetric-printing process for creation of ophthalmic lenses. In some cases, FIG. 5D may also include (not shown) a resin conditioning and reservoir apparatus to hold and maintain a resin; a polymerization apparatus coupled with the resin conditioning and reservoir apparatus, the polymerization apparatus to create a formed lens by transmitting light from a pixelated or beam scan light source having improved light patterns onto and through a curved diffuser 532 located in a chamber of the polymerization apparatus containing the resin and the substrate according to an irradiation pattern such that each point in the resin is illuminated by light from points in the diffuser covering an area which is at least 10% (and up to 100%) of the total area of the diffuser 532. In some cases, theoretically, any point within the liquid resin gets light from any point on the diffuser surface, notwithstanding that if the point is very close to the substrate surface, the contributions from diffuser points far from it are very small (but still, they are there). FIG. 5D can be understood as three modules of the whole system: the DLP, the diffuser 532, and the substrate 501 holding the resin 500. There may be more to the whole system which is not shown in the figure to simplify it, and to focus here on the focusing properties of the DLP on a curved diffuser. This figure may illustrate not that the diffuser is curved, or to represent the whole system, but to illustrate that when the diffuser is curved, the image of point P(522) is not at P'(523) but rather at P"(524), with different XY coordinates. One feature of this disclosure is that the projector must be calibrated to account for this error in the XY coordinates of the image, when curved diffusers are used.

Here, a chamber may contain resin disposed on a substrate.

The curved diffuser 532 may have curved front surface 532C that is parallel to curved back surface 532B, and the front and back surfaces both have a curvature that is the same as a curvature of a front surface for the formed lens (or of surface 501A of the substrate 501). A configuration with matching front and back surface curvatures may be used for all prescriptions. For negative lenses substrates with smaller curvature may be used, but the matching condition (i.e., the diffuser surfaces being parallel between them and parallel to the front surface of the substrate, that is, having all of them the same curvature) may be used regardless the base curve and lens power.

In these embodiments the volumetric-printing diffuser 532 is curved, preferably formed by two parallel front and back surfaces 532A and 532B, which are identical in curvature to the front surface 501A of the substrate or of a formed lens. The diameter of the diffuser is large enough to cover over all of the (x,y) surface size of surface 501A.

Examples of a curved diffuser include a diffuser having a geometry where the height of the middle/center point 532C of the diffuser is in a range of between 0.8 and 14.5 mm in height below the height of the edges 532D for most of the cases, and between 0.8 mm and 30 mm for special cases requiring high base curves, such as for base curve 12. Examples of a curved diffuser include where z(x,y) is the sag of the front surface at coordinates (x,y), and z(x,y) can be, for example, a spherical surface, a conicoidal surface, a torical surface, or, a generalized free-form surface. In some cases, the height variation between the center and the edge of the diffuser depends on the base curve. For base curve 0.5, the difference may be 0.8 mm. For base curve 8, the difference may be 14.5 mm. For base 12, the difference may be 30 mm. Base 12 is very rarely used. For base 10, the difference may be 20 mm.

The advantage of this curved diffuser 532 geometry is twofold: the closer the diffuser to the substrate, the higher the photon density achievable within the resin for a given DLP output optical power which can result in quicker lens formation and/or thicker lenses, which, for a given lens diameter, is equivalent to be able to produce lenses with larger dioptric power. Hence, the use of a curved volumetric-printing diffuser 532 is highly desirable, especially for substrates with base curves≥4 D. In some cases, having the diffuser close to the curve of the substrate (henceforth, having it curved) gives more photon energy inside the resin which speeds up the polymerization process and allow the making of thicker lenses with higher optical power for a given lens diameter. The increased thickness and optical power range may be dependent on parameters of the resin.

FIG. 5D shows the projection lens (e.g., optical system) 507 represented by its principal planes H and H'. FIG. 5D shows the optical axis 259 which is the axis of revolution symmetry of the projector lens. In a typical embodiment, the optical axis 259 matches the optical axis of the diffuser-substrate pair, which in turn can be defined as the line perpendicular to all the four surfaces of the substrate and the diffuser. In a standard DLP, the principal points H,H' and the nodal points N,N' coincide, so the angle θ subtended by the physical pixel P (522) in the DMD 506A from the object principal point H is the same as the angle θ subtended by its image P' (523) in the image plane 521 from the image principal plane H'.

FIG. 5D shows positioning of the angles θ and θ' for better visualization. In FIG. 5D, the principal points of an optical system are denoted H and H' (object and image, respectively). They are located on the system's optical axis and are defined because if an object point is located at H, its image is formed at H' with magnification equal to one. The nodal points N and N' are also on the optical axis and are defined such that if a light/photon ray enters the system through N, it exists the system through N' forming the same angle θ'=θ with respect to the optical axis. When the optical system is immersed in air, N=H and N'=H'.

The planes perpendicular to the optical axis containing either H or H' (N or N') are called principal planes. They are represented in FIG. 5D as 507, with labels H and H'. As the projector lens has air to either side, H=N and H'=N'. Any ray entering the lens through N=H, exists the lens passing through N'=H' and forming the same angle θ'=θ with respect to the optical axis. This is why P' subtends the same angle θ' (with the optical axis) as the angle θ at P.

Even though the first surface 532A of diffuser 532 is tangent to the image plane 521, the image of P on the diffuser is P" (524), rather than P'. Then, if the irradiance pattern at the substrate required for a given target surface, as computed from equation (8), is $I_s$(x", y"), the required irradiance pattern at the image plane 521, $I_p$(x', y') must satisfy:

$$I_s(x'', y'') = I_p(x', y'), \tag{9}$$

where the coordinates at the image plane are related to the coordinates at the substrate by the next equation:

$$x'' = \frac{z(x'', y'') + s'}{s'}x', \; y'' = \frac{z(x'', y'') + s'}{s'}y' \tag{10}$$

Here s is the object distance between the DMD and the object principal point of the DLP projection lens, s' is its corresponding conjugate image distance and z(x,y) is the sag of the substrate surface at coordinates (x,y). The correction provided by equations (9) and (10) allows the computation of a corrected irradiance pattern or an improved light pattern at the substrate $I_s$(x", y") that can be transformed into a matrix $I_{nm}$, either at the image plane 521 or at the DMD plane, by using n=[x'/p]+N/2 and m=[y'/p]+M/2, where p is the size of the projected pixel, if the irradiance matrix is computed at the image plane, or p is the size of the physical pixel, if the matrix is computed at the DMD plane (in which case it is possible to use coordinates x and y), and N×M is the horizontal and vertical number of pixels of the DMD. It is possible that the DMD plane is at pixels 506A. For example, the physical pixel P 522 may be at 506A and the projected pixel P" 524 may be at surface 532A. In some cases, physical pixels are located at the DMD, 522. Projected pixels can be located either at the image plane 521, and their coordinates are named with a prime, or at the substrate 532, and their coordinates are named with a double prime. In some cases, the DMD is a spatial light modulator.

The portrayed spatial calibration of the irradiance distribution takes into consideration the curved surfaces of the volumetric-printing diffuser 532. This calibration, unique to the volumetric-printing process using a curved diffuser 532, may be combined with a standard spatial calibration that will ensure that the image of the DMD at the image plane 521 is a homothetic transformation of the physical DMD 506A without distortions produced by the projecting lens 507. That is to say, the spatial calibration of the DLP must ensure that if ($x_m$, $y_n$) are the spatial coordinates of the physical pixel (n,m) in the DMD 506A, the coordinates of its image at the image plane must be $$(x'_m, y'_n) = (kx_m, ky_n),$$

where k is a constant scaling factor. As these standard spatial calibrations are well known to any expert in the field, they will not be described here. These standard spatial calibrations may be known as spatial calibrations to correct for distortion (distortion is a standard aberration of any optical system, and in particular, of any projection lens).

Irradiance Calibration of the Light Sources

In the set of embodiments of the volumetric printing process, a novel irradiance calibration process for the light sources, such as spatial light modulators, may be required. FIG. 5D may also show schematic 520 of the optical setup for irradiance calibration or improved light patterns of a light source when curved diffusers 532 are, or are to be, employed in the volumetric-printing process.

For any pixelated light source, the ideal relationship between actual output irradiance at any given pixel, $I_{nm}$, and commanded gray level, $g_{nm}$, is given by $I_{nm}=Kg_{nm}$, where K is a constant not depending on the pixel, such as of pixelated light sources of FIGS. 5A-D. The behavior of a real (e.g., non-ideal) source, however, is more complex. In some cases, having K as a constant not depending on the pixel is preferred. There may be a difference between the pixels being commanded different irradiance values and the calibration process. A DMD can be an 8-bit digital device commanded for each pixel, a particular gray level. The maximum gray level may for example be 255, and the minimum may be zero. Assume that any particular pixel, when commanded to shine at 255, gives irradiance of 1

Watt/cm2. Then it would be expected that all pixels, when commanded 255, would shine with 1 Watt/cm2. But, in general, this is not the case as some will shine 0.9 Watt/cm2, and others will shine at 1.1 Watts/cm2 (or some other non 1.0 value). Solving this variance is known as standard spatial calibration: once the actual output for all the pixels have been characterized, each pixel can be commanded to corrected gray level values so that they will each shine with the right irradiance.

In some cases, the pixel is pixel P 522 at 506A, pixel P' 523 at plane 521 and/or projected pixel P" 524 at surface 532A. For example, the (e.g., actual output irradiance) measurement may be done at the image plane 521, but regarding the pixel, it may not matter whether the pixel at plane 521 or at the DMD plane 506A is being tracked or measured. In some cases, the DMD is inside the projector, so the measurements are made at the projection plane 521.

The second type of standard calibration is due to the fact that if a gray level of 254 makes the pixel shine at 1 Watt/cm2, a gray level of 127 should make the pixel shine at 0.5 Watts/cm2. In general, this may not be true, in which case all the gray levels must be commanded, and the output at each gray level measured, and the actual relationship between the two established.

Figure 5E:
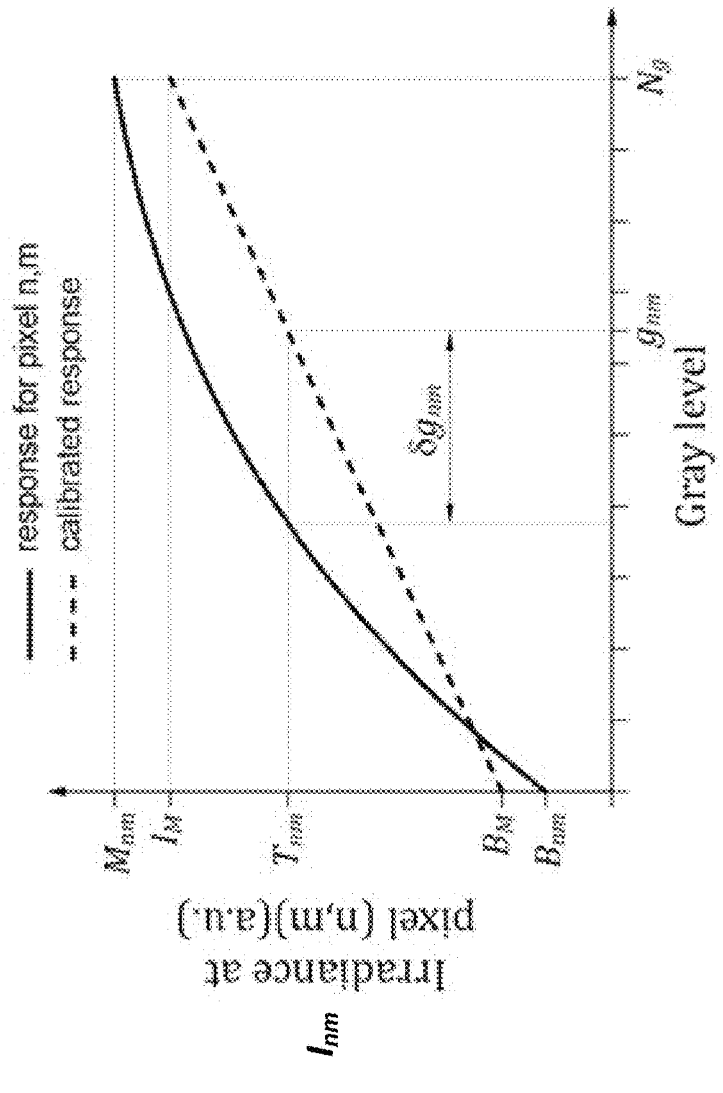
FIG. 5E shows actual irradiance response and calibrated response of a pixelated light source for a pixel.

FIG. 5E shows plot 530 of actual irradiance response as a solid line and calibrated response as the dashed line along $I_{nm}$ and the gray level of a typical or real pixelated light source for the pixel (n,m). In some cases, the pixel (n,m) is pixel P 522 at 506A, pixel P' 523 at plane 521 and/or projected pixel P" 524 at surface 532A. For example, those three pixels may be the same pixel, that is, they may have the same row and column coordinates n,m. More precisely, they may be the same logical pixel. As the DMD is inside the DLP, the measurement of irradiance may actually be done at the image plane. So, the three pixels are the same pixel, but its irradiance may be measured at P'. The responses are plotted along the vertical y-axis that may be measured in arbitrary units (a.u.) and the gray level plotted along the horizontal x-axis that may be measured in gray levels. In some cases, the Y axis (e.g., horizontal axis of FIG. 5E) encodes irradiance. However, irradiance is rarely measured in W/m2. Typically, photodetectors are used whose response is extremely linear, but unknown (and most of the times, not needed). In this case, the units are reported as "arbitrary". For example, gray levels may be dimensionless numbers that should be proportional to irradiance at the image plane.

As shown in plot 530, there can be a background or zero-level irradiance $B_{nm}$ even when the commanded gray level is zero, and the relationship between irradiance and gray level is not linear as shown by the arched shape of the solid line. Also, the behavior is pixel-dependent, so the actual relationship is $I_{nm}=B_{nm}+f_{nm}(9\ nm)$, where $f_{nm}$ are usually monotonically growing functions, and $B_{nm}$ is the zero-level irradiance for pixel (n,m). The functions $f_{nm}$ satisfy $f_{nm}(0)=0$ and $f_{nm}(Ng)=M_{nm}-B_{nm}$, where Ng is the maximum number of gray levels allowed by the light source electronics, and $M_{nm}$ is the maximum irradiance delivered by the light source at pixel (n,m).

The solid line response of plot 530 is, in general, nonlinear and pixel-dependent, with a zero-level and maximum irradiance for pixel (n,m), $B_{nm}$ and $M_{nm}$, respectively. If $B_M=\max(B_{nm})$ and $I_M \min(M_{nm})$ it is possible to create a calibrated response for all the pixels, $C_{nm}=B_M+[(I_M-B_M)/N_g]g_{nm}$. This dashed line calibrated response of plot 530 is linear and varies between the minimum value $B_M$ and the maximum value $I_M$ for all the pixels. Now, it is possible to compute the difference $\delta dg_{nm}$ between the gray levels that provide the same irradiance for the dashed line calibrated response, $g_{nm}$, and the actual solid line response, and store difference $\delta g_{nm}$ as the calibration information for the light source.

In some cases, the optimization of equation (8) results in a target irradiance distribution $T_{nm}$. In this case, a gray level for the calibrated response can be computed according to the expression $g_{nm}=Ng\ (T_{nm}-B_M)/(I_M-B_M)$. In this case, the gray level that must be commanded to the light source can be $g_{nm}+\delta g_{nm}$, so that $T_{nm}=B_{nm}+f_{nm}(g_{nm}+\delta g_{nm})$. It may be important paying attention to the fact that, even after calibration, most pixelated light sources will not be able to provide a true zero signal, or, in other words, $B_{nm}$ will be strictly larger than zero. To overcome this problem, the minimization of M(I) in equation (8) can be solved with restrictions as equation (11):

$$\min\left\{\sum_i w_i[z_P(x_i, y_i, I) - z_L(x_i, y_i)]^2\right\}, \quad B_M \le I \le I_M, \tag{11}$$

which in general is possible as there are infinite many solutions to the minimization problem.

In some cases, the calibrations related to FIGS. 5D-5E and equation (11) are for spatial calibration and/or irradiance calibration (e.g., such as to produce or for an improved light pattern) of a pixelated light source across a two-dimensional pattern of coordinates (x,y) of the pixels across image plane 521 or front surface 532A of the curved diffuser 532 during a period of time where the level of illumination of each pixel is constant. These pixels may be pixels P 522 at 506A, pixels P' 523 at plane 521 and/or projected pixels P" 524 at surface 532A as noted for FIG. 5E. In this case, the irradiance pattern used to polymerize the resin changes with the spatial coordinates (x,y) but does not change with time t.

Figure 5F:
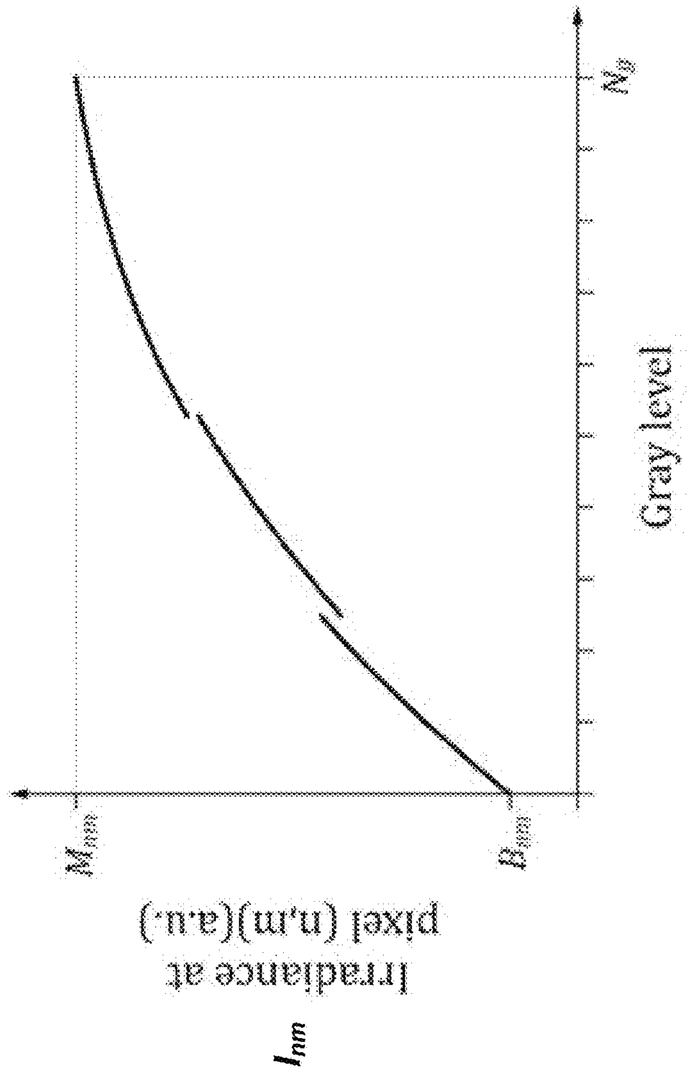
FIG. 5F shows a typical irradiance response of a pixelated light source for which the functions $f_{nm}$ are not inversible and cannot be calibrated with enough accuracy.

Depending on the driver electronics and the physical structure of the pixelated light source, there may be cases in which the functions $f_{nm}(g_{nm})$ are not monotonically growing functions, and they cannot be accurately inverted to obtain $\delta g_{nm}$. For example, FIG. 5F shows plot 540 of a typical irradiance response as a solid but broken line, along $I_{nm}$ and the gray level, of a pixelated light source for which the functions $f_{nm}$ are not inversible and cannot be calibrated with enough accuracy.

Plot 540 may be the solid but broken line of an actual irradiance response of a typical or real pixelated light source for the pixel (n,m). These pixels may be pixels P 522 at 506A, pixels P' 523 at plane 521 and/or projected pixels P" 524 at surface 532A as noted for FIG. 5E. The response is plotted along the vertical y-axis that may be measured in arbitrary units (a.u) and the gray level plotted along the horizontal x-axis that may be measured in gray levels. In some cases, the Y axis (e.g., horizontal axis of FIG. 5E) encodes irradiance as noted for FIG. 5E.

The errors leading to non-inverting functions $f_{nm}$ are usually small, and they typically do not pose a problem for visual applications, or even for using pixelated light sources for metrological purposes. However, the methods, devices, systems and lenses described herein, such as the volumetric printing of ophthalmic lenses, require a very precise control of the irradiance level and the time for which it is applied. Therefore, the non-inverting functions $f_{nm}$ cannot typically be used for volumetric printing of ophthalmic lenses. Instead, it is possible to use the following "space-time" pixelated light patterns that allow for calibration of pixelated light sources for which the functions $f_{nm}$ are not monotonically growing and/or discontinuous.

In some cases, a space-time pixelated light pattern may include when the irradiance pattern or improved light pattern used to polymerize the resin not only changes with the spatial coordinates (x,y) but also with time t. This new change of time feature has the advantage of being robust against discontinuities of the irradiance response. To describe the new change of time feature, it can be assumed that the maximum irradiance time has been set to $t_{max}$. Also, exposure E can be defined as irradiance I multiplied by time t, such that E=It. Using the new change of time feature, equation (11) can be re-written in terms of exposure as equation (12):

$$\min\left\{\sum_i w_i\left[z_P(x_i, y_i, E/t) - z_L(x_i, y_i)\right]^2\right\}, \quad B_M t_{max} \le E \le I_M t_{max}, \tag{12}$$

In the case of systems where $B_M$ cannot trigger any polymerization reaction after time $t_{max}$, the use of exposure E instead of (e.g., only) irradiance I has the added advantage of arbitrarily increasing the dynamic range by using $t_{max}$ sufficiently large. Upon calculating $E_{nm}$ using equation (12), the pixel (n,m) must be switched on for a time $t_{nm} \le t_{max}$ such that the exposure provided by that pixel equals $E_{nm}$. These pixels may be pixels P 522 at 506A, pixels P' 523 at plane 521 and/or projected pixels P" 524 at surface 532A as noted for FIG. 5E._This gives a great deal of flexibility. For example, if the pixels are always switched on with the largest gray level, then each pixel must be switched on for the duration $t_{nm}=E_{nm}/[B_{nm}+f_{nm}(N_g)]$.

In some cases, the calibrations related to FIGS. 5D-5E and equation (12) are for spatial calibration and/or irradiance calibration of a pixelated light source across a two dimensional pattern of coordinates (x,y) of the pixels across image plane 521 or front surface 532A of the curved diffuser 532 during a period of time where the level of illumination of each pixel changes over time. These pixels may be pixels P 522 at 506A, pixels P' 523 at plane 521 and/or projected pixels P" 524 at surface 532A as noted for FIG. 5E. In this case, the irradiance pattern used to polymerize the resin not only changes with the spatial coordinates (x,y) but also with time t. In this case, the irradiance pattern or each pixel may start at the lowest light or most gray level, and the end at the maximum light or least gray level over time t.

In some cases, a space-time pixelated light pattern may include when equation (12) is solved to compute the exposure pattern that, after time $t_{max}$ will yield a polymerization front matching the target surface $z_L(x,y)$, this pattern being $E_{nm}$. In these cases, it is possible to compute the matrix of times $t_{nm}=E_{nm}/[B_{nm}+f_{nm}(N_g)]$, where the matrices and functions $B_{nm}$ and $f_{nm}$ are characteristics of the pixelated light source used in the system (e.g., of FIG. 5D) and have been previously measured. Then, when the resin has been dispensed on the substrate and is ready, all the pixels are switched on at $t=t_0$ with the maximum gray level, Ng. Pixel (n,m) will then be turned off at time $t_0+t_{nm}$, and different parts of the pattern will get switched off as the polymerization proceeds. The polymerization process ends when all the pixels get switched off. With this strategy, most or all the pixels are fully lit at $t=t_0$ and all the pixels are switched off at $t=t_0+t_{max}$.

These cases may be similar to the calibrations related to FIGS. 5D-5E and equation (12) for spatial calibration and/or irradiance calibration, except in this case, the irradiance pattern or each pixel may start at the maximum light or least gray level, and then end at the lowest light or most gray level over time t.

In some cases, a space-time pixelated light pattern may include when once the times $t_{nm}$ have been computed as explained before, the polymerization process starts at $t=t_0$, with all the pixels being switched off. The pixel (n,m) is switched on after a time $t_0+t_{max}-t_{nm}$. Then it keeps being lit until time $t_{max}$ is reached. With this strategy, the irradiance pattern is completely dark at $t=t_0$ and fully lit at $t=t_0+t_{max}$.

These cases may be similar to the calibrations related to FIGS. 5D-5E and equation (12) for spatial calibration and/or irradiance calibration, except in this case, 1) the irradiance pattern or each pixel may start at the lowest or at the maximum light level, and end at the maximum or at the lowest light level, respectively, over time t; and 2) may not start to be lit until only the amount of time needed for it to be lit is left until time $t_{max}$ ends.

In some cases, a space-time pixelated light pattern may include when the time interval in which a given pixel is switched on does not necessarily start at $t=t_0$, and neither necessarily ends at $t=t_{max}$. If we call the time a given pixel is switched off $T_{nm}=t_{max}-t_{nm}$, a given pixel may be switched on at a time $t_{0\ nm} \le t_0+T_{nm}$. This same pixel would be switched off at time $t_{0\ nm}+t_{nm}$.

These cases may be similar to the calibrations related to FIGS. 5D-5E and equation (12) for spatial calibration and/or irradiance calibration, except in this case, 1) the irradiance pattern or each pixel may start at the lowest or at the maximum light level, and end at the maximum or at the lowest light level, respectively, over time t; 2) may only be lit for the amount of time needed $t_{nm}$; and 3) may be lit during a time other than between $t=t_0$, and time $t_{max}$.

In some cases, a space-time pixelated light pattern may include when the pixels of the pixelated light source are switched on and off many times in the interval from $t_0$ to $t_0+t_{max}$. In these cases $$t_{0nm}^i$$

is the ith instant of time the pixel (n,m) is switched on, and $$t_{nm}^i$$

is the interval of time for which the pixel remains switched on after $$t_{0nm}^i.$$

For these cases to work, the conditions of equation (13) must be met, $$t_{nm} = \sum_{i=1}^{v_{nm}} t_{nm}^i, \quad t_{0nm}^i > t_{0nm}^{i-1} + t_{nm}^{i-1}, \; i = 2, 3, \ldots, v_{nm} \quad t_{nm}^{v_{nm}} \le t_{max} - t_{0nm}^{v_{nm}}, \tag{13}$$

where $v_{nm}$ is the number of switching events for pixel (n,m). In particular, the sequences $$\{t_{0nm}^{i}\} \text{ and } \{t_{nm}^{i}\}$$

can be random, as long as conditions of equation (13) are satisfied.

These cases may be similar to the calibrations related to FIGS. 5D-5E and equation (12) for spatial calibration and/or irradiance calibration, except in this case, 1) the irradiance pattern or each pixel may start at the lowest or at the maximum light level, and end at the maximum or at the lowest light level, respectively, over time t; 2) may only be switched or flashed on (e.g., lit) for the amount of time needed $t_{nm}$; and 3) may be lit during a time other than between $t=t_0$, and time $t_{max}$.

Finally, a space-time pixelated light pattern may include when all the cases previously described can be modified so that the gray level for pixel (n,m) is not maximal, but any number between 0 and $N_g$. In particular, once equation (12) is solved to compute the exposure pattern that, after time $t_{max}$, will yield a polymerization front $z_p(x,y)$ matching the target surface $z_L(x,y)$, this pattern being $E_{nm}$, the exposure values must be achieved by proper matching of gray levels and switch-on times for every pixel. In some of these cases, in order to determine the switching pattern of the pixels (given by the sequences $$\{t_{0nm}^{i}\} \text{ and } \{t_{nm}^{i}\})$$

the exposure E in equation (12) must first be found.

In general, a space-time pixelated light pattern may include when the pixels of the pixelated light source can be switched on and off many times in the interval from $t_0$ to $t_0+t_{max}$, with $$t_{0nm}^{i}$$

being the ith instant of time the pixel (n,m) is switched on, with $$t_{nm}^{i}$$

the interval of time for which the pixel remains switched on after $$t_{0nm}^{i},$$

and with $$g_{nm}^{i}$$

the gray level at which the pixel is activated at $$t_{0nm}^{i}.$$

In these cases, the N×M arrays may be arranged so they satisfy the conditions of equation (14), $$E_{nm} = \sum_{i=1}^{v_{nm}} t_{nm}^{i}\left[B_{nm} + f_{nm}\left(g_{nm}^{i}\right)\right], \tag{14}$$

$$t_{0nm}^{i} > t_{0nm}^{i-1} + t_{nm}^{i-1},\ i = 2, 3, \ldots, v_{nm}$$

$$t_{nm}^{v_{nm}} \le t_{max} - t_{0nm}^{v_{nm}},$$

where, as before, $v_{nm}$ is the number of times the pixel (n,m) is switched on.

In a particular implementation of these cases, $$t_{nm}^{i} = t_{0nm}^{i+1} - t_{0nm}^{i}$$

for some of the values of i, henceforth the pixels undergo irradiance variations without being switched off. In another implementation of these general cases, the arrays $$\{t_{0nm}^{i}\}, \{t_{nm}^{i}\}, \text{ and } \{g_{nm}^{i}\},$$

contain random entries such that conditions of equation (14) are satisfied. In this case, the pattern looks like the typical TV snow pattern, but subtlety, after time $t_{max}$, it delivers the exposure pattern $E_{nm}$. These patterns can be named "space-time patterns" as they deliver the required space-dependent exposure by means of a time-varying space-dependent irradiance pattern.

These cases may be similar to the calibrations related to FIGS. 5D-5E and equation (12) for spatial calibration and/or irradiance calibration, except in this case, 1) the irradiance pattern or each pixel may switch on at any light level at any time and switch off at any time as long as it is lit with the required amount of light for the amount of time needed, such as to satisfy going from the lowest light level to the maximum light level during time $t_{nm}$.

The advantages of such "space-time" calibration or calibrated pixelated light patterns are multiple. On the one hand, they allow for calibration of pixelated light sources for which the functions $f_{nm}$ are not monotonically growing and/or discontinuous. On the other hand, they can be adapted to the dynamics of the polymerization reaction of the system being used. For example, if a resin/photo-initiator system is prone to auto acceleration and it is desired to control this effect, a temporal pattern will be used in which most of the pixels start in the off state and progressively are switched on. Conversely, if the resin/photo-initiator system exhibits a low polymerization starting speed, a temporal irradiation pattern can be used in which all the pixels start on. Also, if the system behaves best when the curing radiation is provided over the total exposure time $t_{max}$, a random space-time irradiance pattern can be used so that the arrays $$\{t^i_{0nm}\} \text{ and } \{t^i_{nm}\}$$

are random but homogenously distributed over the interval $[t_0, t_0+t_{max}]$.

An example of a practical implementation of the previous cases of space-time pixelated light patterns may use a discretized time frame. Time from $t_0$ to $t_0+t_{max}$ is discretized in $N_t$ intervals. The projected pattern can be implemented as a video with $N_t$ frames and duration $t_{max}$ seconds, each frame being shown for a lapse of time $\Delta t=t_{max}/N_t$. If it is assumed that the gray level at each pixel, $g_{nm}$, is going to be constant for the duration of the video, then, the pixel must be switched on for a time $t_{nm}=E_{nm}/[B_{nm}+f_{nm}(9\text{ nm})]$. The gray level $g_{nm}$ can be random but it must be chosen so that $t_{nm}\leq t_{max}$. Then, the video must contain $N_{fnm}=t_{nm}/\Delta t$ frames for which the pixel is "on". For each pixel there will be a binary array $$v_{nm} = \underbrace{(1, 0, 0, 1, \ldots , 0, 1)}_{N_t}$$

indicating for which frame the pixel is switched on ("1") or off ("0"). $N_{fnm}$ entries in $v_{nm}$ will be set to "1", the remaining entries will be zero. For each pixel in the pixelated source, a random permutation of $v_{nm}$ will create the activation sequence of that pixel. The whole set $v_{nm}$ with n=1, . . . , N, and m=1, . . . , M, will define the complete video. Reproducing this video at the pixelated source with a frame rate of $1/\Delta t$ frames/second will reproduce the desired exposure pattern $E_{nm}$ in a completely random way. Other, non-random permutation of $v_{nm}$ can also be used to create the activation sequence of that pixel, such as permutations noted herein.

In some cases, the video is a set of Nt frames. Each frame is a pattern, a matrix containing the N×M pixels of the DMD. One pixel, for example, the pixel n,m, for some frames in the video will be activated (on), and for other frames will be inactive (off). Vector v_nm is a vector, not a matrix, containing Nt entries. When the entry is 1, the corresponding frame will have pixel n,m on. When the entry is 0, the corresponding frame will have the pixel n,m off. Each pixel requires its vector v. There will be N×M vectors "v", each of them with Nt entries.

The calibration techniques, advantages and examples above for improved light patterns such as space-time pixelated light patterns, apply to ophthalmic lenses using curved or flat (e.g., non-curved) diffuser techniques.

In some cases, the irradiation pattern or improved light pattern of light source for FIGS. 5A-5F is a pixelated light source having pixels, where each pixel is one of: a light emitter that can be independently controlled or is controlled by a digital light projector (DLP). In these cases, the irradiance distribution is spatially calibrated by taking into consideration the front and back surfaces of a curved diffuser 532 or of a flat diffuser; and the irradiance distribution is irradiance calibrated to have a calibrated response that is linear and varies between a non-zero-level irradiance minimum value and a maximum irradiance delivered by the light source for each of the pixels. In these cases, the irradiance distribution may be spatially calibrated by taking into consideration the curved front and back surfaces of the curved diffuser 532; or the flat front and back surfaces of a flat diffuser. In some cases, the irradiance distribution is spatially or irradiance calibrated using an irradiance pattern that changes with the spatial coordinates but does not change during a period of time, such as for equations (8)-(11). In some cases, the irradiance distribution is spatially or irradiance calibrated using an irradiance pattern that changes with the spatial coordinates and changes during a period of time, such as for equation (12). In some cases, the irradiance distribution is spatially or irradiance calibrated using an irradiance pattern for each pixel: starts at the minimum light level and then ends at the maximum light level over the period of time; starts at the maximum light level and then ends at the lowest light level over the period of time; does not start to be lit until only the amount of time needed for it to be lit is left until the time period ends; switches on then off for periods during a time longer than the time period; is flashed on or off many times during a time longer than the time period; or is switched on at any light level at any time, and switch off at any time as long as it is lit with a required amount of light for an amount of time needed.

Beam Scan Sources

The previous discussion (e.g., of FIGS. 5A-5F) was related to pixelated light sources. The manufacturing system using or based on the volumetric printing process described herein may use an illuminating system or spatial light modulation based on beam scanning techniques, having improved light patterns as well. These sources are characterized as having a light source emitting a single light beam forming a relatively small spot at some output plane, and a scanning system that deviates the beam and scans the spot over the output plane. The light source is typically a laser or a collimated LED, though other light sources can also be used. The most used scanning systems are galvo-based deflectors and acousto-optic modulators.

Figure 5G:
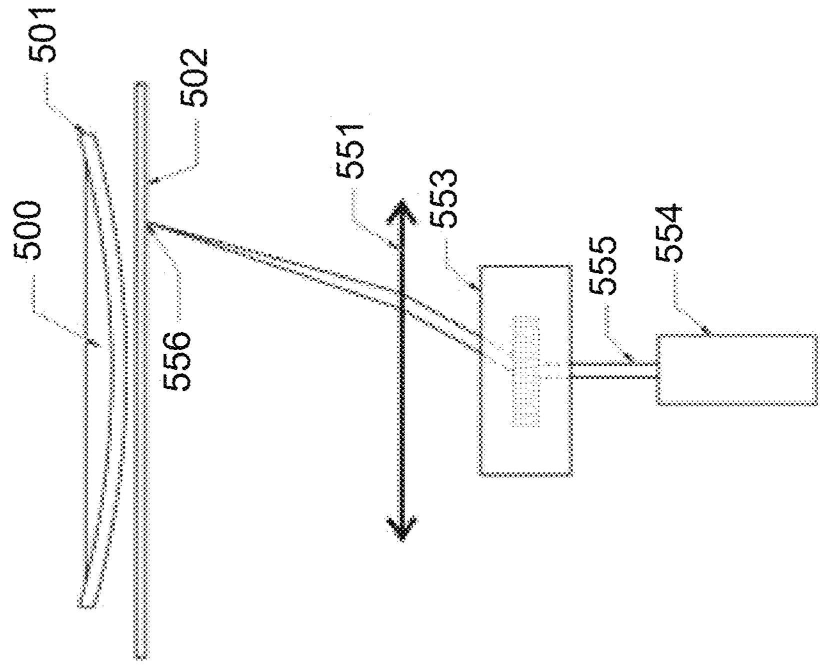
FIG. 5G-5H show beam scan sources that can be used in a volumetric printing system.
Figure 5H:
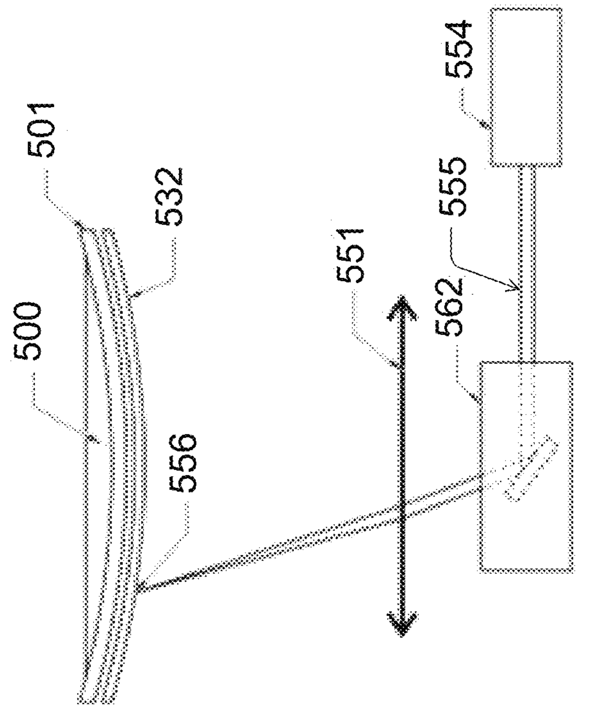

FIG. 5G show beam scan source that can be used in a volumetric printing system having improved light patterns. FIG. 5H show beam scan source that can be used in a volumetric printing system having improved light patterns. FIGS. 5G and 5H may show set ups of volumetric printing system using beam scan sources having improved light patterns. The substrate 501 holds resin 500 as in previous descriptions of a volumetric printing system. Also, the volumetric printing process requires a diffuser that can be a flat or planar diffuser 502 for FIG. 5G or curved diffuser 532 for FIG. 5H. The light source proper 554 typically emits a collimated beam of light 555, although in some embodiments the beam can have positive or negative vergence. The beam of light 555 is deflected by a galvo scanning system 562 for FIG. 5H or an acousto-optic modulator 553 for FIG. 5G. Both share the same capacity for steering the light beam with high velocity. In a typical application, a theta-scan lens 551 is used to convert angular deviations from the galvo system 562 or the acousto-optic modulator 553 into cartesian coordinates. Also, the theta-scan lens 551 focusses the light beam on a plane, generating the spot of light 556 that will deliver the required energy to the resin 500. In FIG. 5G an acousto-optic modulator 553 is used along with a plane diffuser 502, while in FIG. 5H a galvo system 562 is used along with a curved diffuser 532. However, any combination of scanning system and diffuser geometry can be used.

Features 554, 555, 553, 551 and 556 may be considered the beam scan light source of FIG. 5G. In some cases, beam 556 may be considered the beam scan light source of FIG. 5G. Features 564, 562, 561 and 556 may be considered the beam scan light source of FIG. 5H. In some cases, beam 556 may be considered the beam scan light source of FIG. 5H.

Figure 5I:
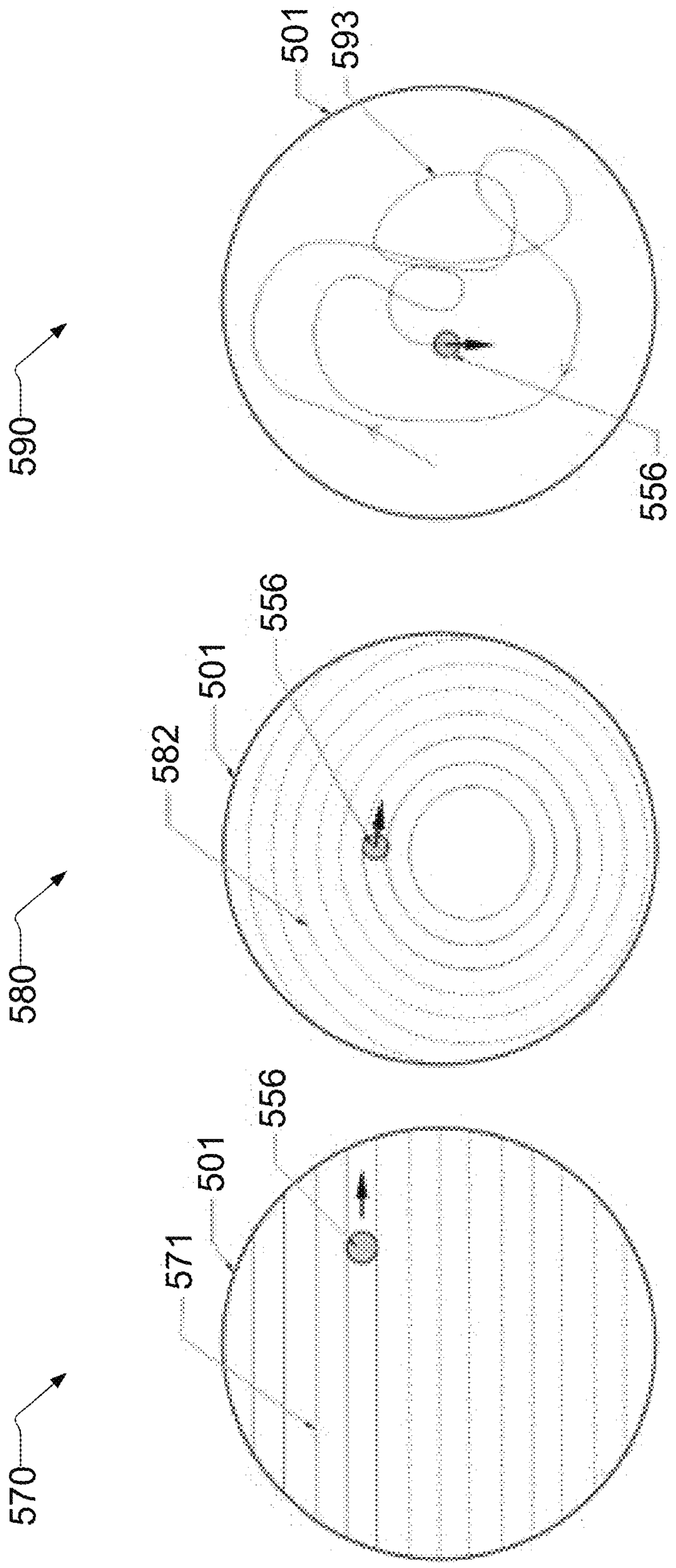
FIG. 5I shows different scanning strategies for a volumetric printing process.

FIG. 5I shows different scanning strategies for the volumetric printing process using a beam scanning light source having improved light patterns. The focused light 556 can be scanned over the diffuser 502 or 532 using different strategies. In a raster-scan system 570 shown in FIG. 5I, the spot 556 is displaced along lines 571 stretching, such as in the direction shown by the arrow, along one dimension of the diffuser 502 or 532, or of the substrate 501. In order to achieve the desired irradiance pattern E(x,y), the local velocity and the local speed of the spot 556 is adjusted so that equation (15) is met, $$E(x, y) = \int_{-t_s/2}^{t_s/2} I(x - v(x, y)t, y)dt. \tag{15}$$

where I(x,y) is the irradiance distribution of the spot 556, and v(x,y) its local velocity at (x,y). For a uniformly distributed spot 556 (e.g., a top-hat spot) whose irradiance changes as it is scanned over the diffuser, the relation between exposure, irradiance, and speed, turns into equation (16)

$$E(x, y) = \frac{I(x, y)\phi}{v(x, y)} \tag{16}$$

where ϕ is the diameter of the spot 556. Local exposure can be controlled by changing the local velocity or irradiance of the spot 556. Changes in diameter of the spot 556 are more difficult to obtain and implement, so spot diameter should be left as a constant parameter. Total scanning time, for a circular diffuser 532 with the spot 556 diameter $\phi_D$ is given by equation (17)

$$t_{max} = (\overline{E}/\overline{I})(\phi_D/\phi)^2, \tag{17}$$

where $\overline{E}$ and $\overline{I}$ are averaged values of E(x,y) and I(x,y).

Embodiment described herein include a substrate (e.g., substrate 501) holding resin 500, on top of a volumetric-printing diffuser that can be a flat diffuser or a curved diffuser, and a beam scan source having improved light patterns that illuminates the diffuser such as shown in FIGS. 5G-5I. The necessary exposure is computed by minimization of equation (12), and from that minimization it is possible to obtain a distribution of exposure E(x,y) that must be applied to the diffuser (flat or curved) so that the polymerization front $z_p$(x,y) (e.g., of resin 500) matches the target surface $z_L$(x,y). The exposure distribution may be achieved by a raster-scan technique 570 in which a spot 556 having improved light patterns is scanned over the diffuser with irradiance and speed satisfying equation (15) and where the balance between irradiance and speed is determined by setting a value for $t_{max}$ according to equation (17).

In a vector-scan system 580 shown in FIG. 5I, the beam spot 556 having improved light patterns is displaced along lines 582 stretching, such as in the direction shown by the arrow, parallel to the iso-exposure lines of the exposure distribution E(x,y) of the diffuser 502 or 532, or of the substrate 501. For system 580 the conditions on irradiance, scan speed, and exposure, are similar to those explained for raster-scan system 570. For system 580 these conditions may include equations (12) and (15)-(17) such as explained for raster-scan system 570.

In a random path-scan system 590 shown in FIG. 5I, the beam spot 556 having improved light patterns is displaced along lines 593 running, such as in the direction shown by the arrow, randomly along a computer generated random path on the diffuser 502 or 532, or on the substrate 501. For system 590 the conditions on irradiance, scan speed, and exposure, are similar to those explained for raster-scan system 570. For system 590 these conditions may include equations (12) and (15)-(17) such as explained for raster-scan system 570.

In some cases, the beam scan source patterns can be named “space-time patterns” as they deliver the required space-dependent exposure by means of a time-varying space-dependent irradiance pattern. These beam sources may produce improved light patterns such as dynamic light patterns with respect to space and/or time. The beam scan sources above apply to ophthalmic lenses using curved or flat diffuser techniques. The beam scan sources may be improved light patterns formed using better calibration techniques for dynamic light patterns.

In some cases, the improved light pattern light source for FIGS. 5G-I is a beam scan light source emitting a single light beam forming a relatively small spot at an output plane, and having a scanning system that deviates the beam and scans the spot over the output plane to form an irradiance distribution. In these cases, the irradiance distribution may be spatially calibrated by taking into consideration the front and back surfaces of the curved diffuser 532 or of a flat diffuser; and where the irradiance distribution is irradiance calibrated using one of: raster, circular or random scanning of the spot over the curved diffuser. In these cases, the irradiance distribution may be spatially calibrated by taking into consideration the curved front and back surfaces of the curved diffuser 532; or the flat front and back surfaces of a flat diffuser.

Any of the light sources and/or spatial light modulators described for FIGS. 5A-5I may be or provide improved light patterns and may need a calibration process described herein which may be part of providing the improved light patterns.

During the process of monomer polymerization, the input patterns $I_{nm}$ can be modified with the information provided by one or more sensors or sensor systems which are used to measure the resin in the container and the polymerization front as it grows. This real-time close-loop process allows for tight control of the polymerization front and avoids or cancels instabilities that could affect its shape. The sensors and sensor systems used in the polymerization process include one or more a visual inspection system (VIS) camera, an infrared (IR) camera, an ultrasound topography system, a tomography system, a moiré topography system, an interferometric topography system, temperature sensors, and other similar devices and systems. These techniques are used in the polymerization apparatuses shown in and described regarding FIGS. 7A and 7B below and the metrology system described below and shown in FIG. 10.

Description of System and Constituent Apparatus

The lens producing system described herein includes, but is not limited to, the following components:

Resin conditioning and reservoir apparatus,

Polymerization apparatus,

Metrology apparatus,

Resin drainage apparatus, and

Postcuring apparatus.

Resin Conditioning and Reservoir Apparatus

The creation and evolution of the polymerization front depends on multiple parameters, as described above. For this reason, tight control over the resin formulation is maintained. The resin includes a combination of inhibitor and photoinitiator. The inhibitor and photoinitiator must be stored and used at particular temperatures.

One inhibitor of chain photopolymerization reactions is oxygen. The oxygen may be diffused inside the resin from the surrounding air, a process that produces a concentration gradient inside the resin. This gradient could result in an inhomogeneous resin that might disrupt the shape of the polymerization front. For this reason, the concentration of any inhibitor inside the resin, including oxygen, must be kept at a known appropriate and constant level. The components of the resin must be homogeneous before an input pattern is projected.

To achieve a homogeneous resin having an appropriate concentration of oxygen, some of the possible options are:

Store the resin in container with an oxygen-free atmosphere (for example nitrogen).

Use an oxygen scavenger that is compatible with the resin.

Saturate the resin with oxygen.

Saturate the resin with a gas with a certain percentage of oxygen (for example air), which ensures a constant concentration of oxygen below saturation.

De-gas the resin.

Figure 6:
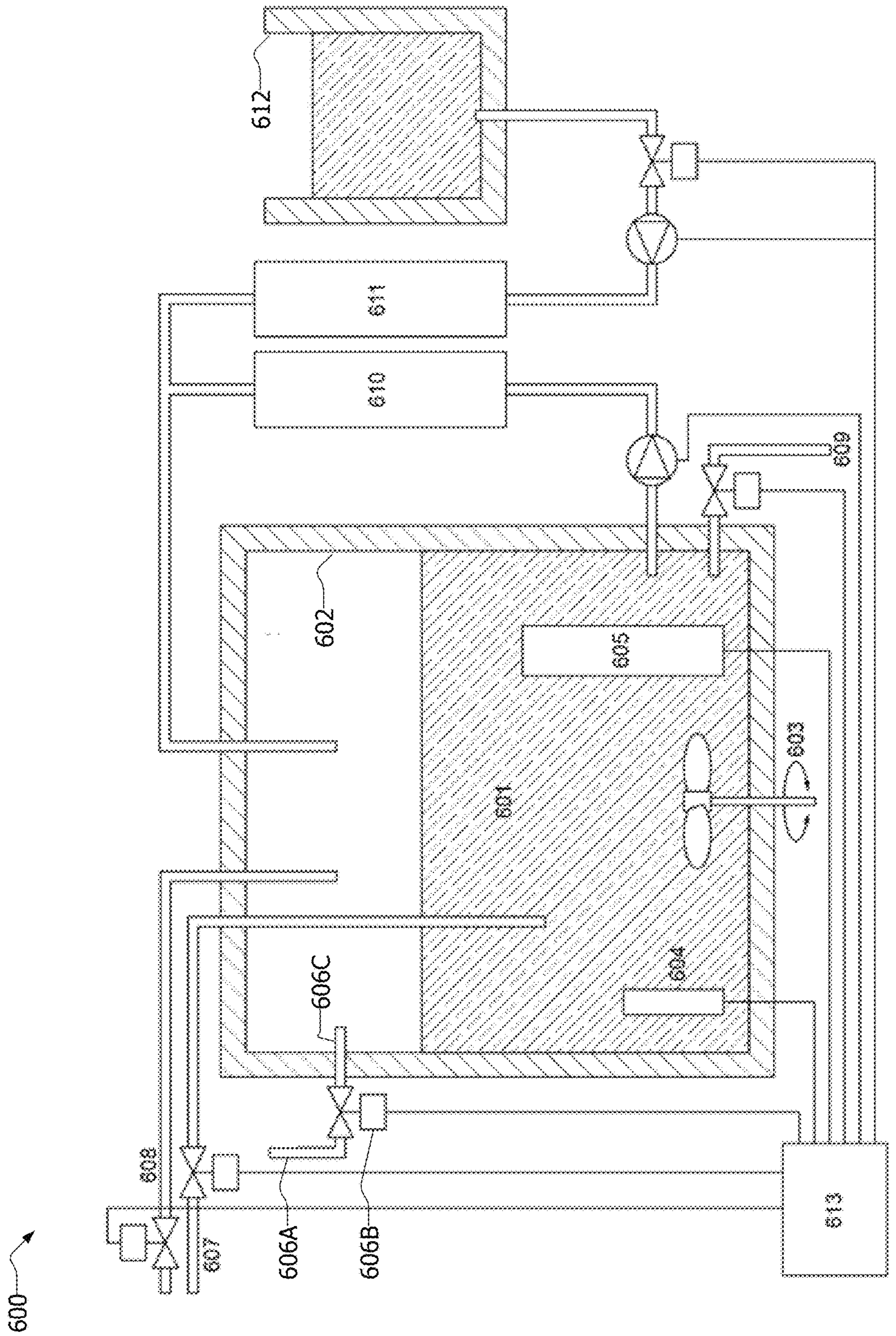
FIG. 6 is a schematic drawing showing a system for monomer polymerization for lens creation.

A resin conditioning and reservoir apparatus is used to hold the liquid resin and maintain its chemical composition in an appropriate and constant state. One embodiment of a resin conditioning and reservoir apparatus 600 is shown in FIG. 6. The liquid resin 601 is held inside a closed tank 602. A set of sensors, actuators and pipes that run in and out of the tank with corresponding valves and pumps are controlled by controller 613 that includes electronics and software. A mixing mechanism 603 is provided in the tank 602 to actuate, stir and/or mix the components of the resin so the components of the resin are kept thoroughly mixed and uniformly distributed. Oxygen, clean and dry air, or any preferred mix of gases can be pumped or bubbled into the resin through conduit 607 to increase solubility and help mixing. Also, a preferred gas can be introduced in the tank 602 to control the partial pressures of each gas in the atmosphere inside the chamber through pipe 608. A venting mechanism is provided to allow for changes in the composition of the atmospheric component inside the tank, and to control internal pressure. The venting mechanism may include components including pipes, valves and pumps. In the embodiment shown in FIG. 6, the venting may be achieved with pipe 606A and 606C and valve 606B connected with and controlled by controller 613. Sensors 604 are included in the tank 602. In one embodiment, a typical sensor array allows for measuring physical and chemical parameters such as temperature, oxygen concentration, nitrogen concentration, and the like. Either or both pipe 608 and/or 606A may be used to create a vacuum inside the tank to degas the resin. An oxygen scavenger mechanism (not shown) may optionally be included in the tank to degas the resin. A heater 605 may be included in the tank 602 to control temperature of the resin 601. The pipe 609 is used to extract the resin and deliver it to a polymerization apparatus like those shown in FIGS. 7A and 7B, described below.

A filtering system 610 consisting of a pump/valve mechanism and a filter is connected to the tank 602 to remove particles that would interfere with production of lenses, impeding lens formation and/or reducing lens quality. In one embodiment, particles having size above 0.5 microns are removed by the filtering system 610. In addition, the filtering system 610 may remove gel-type polymer formed by spontaneous polymerization or during the printing process. The filtering system 610 may work persistently in a closed loop or at specified time intervals, depending on the particular characteristics of the resin and the polymerization process. The filtering system may be coupled to and controlled by controller 613.

A resin recovery system 612 may be included in the resin conditioning and reservoir apparatus 600. Remnants of liquid resin from previous polymerization processes may be poured into tank 612, filtered via filter 611 and incorporated into the conditioning and reservoir apparatus. Concentration of initiator and inhibitors can be measured in the remnants of resin (for example, by means of well-known spectroscopic techniques) prior to introducing the remnants to the tank 612 or as the resin seats on the tank. Concentration of the components of the resin may be adjusted by adding appropriate amounts of inhibitor, initiator and/or monomer/oligomer prior to the introduction of the resin into the conditioning/reservoir tank 602.

Polymerization Apparatus

Figure 7A:
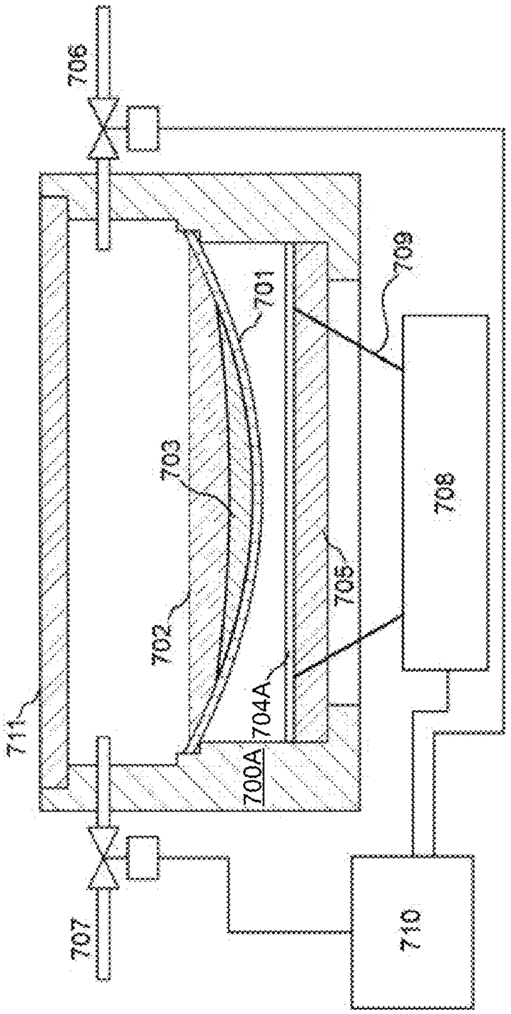
FIG. 7A is a schematic drawing showing a first version of a polymerization apparatus.
Figure 7B:
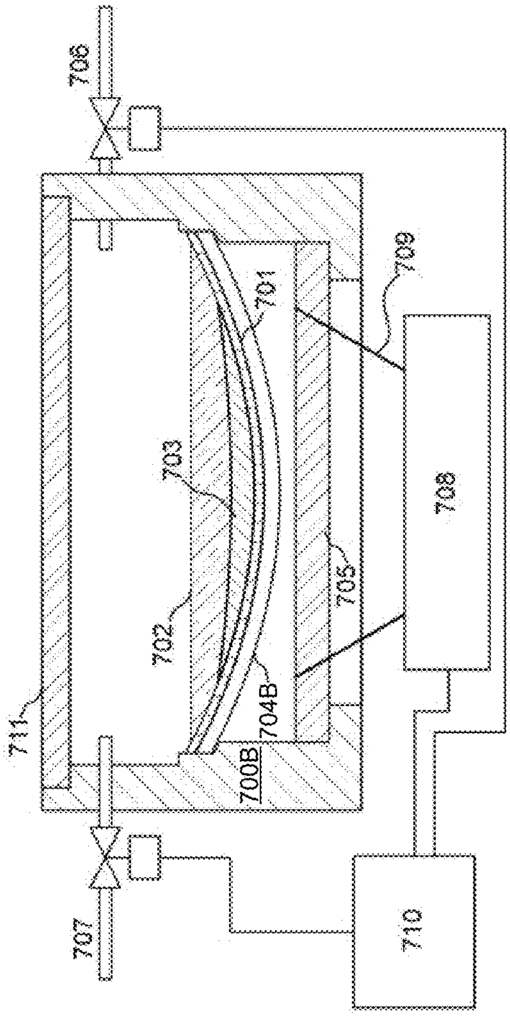
FIG. 7B is a schematic drawing showing a second version of a polymerization apparatus.

Referring now to FIGS. 7A and 7B, two exemplary embodiments of a polymerization apparatus are shown. The polymerization apparatus is composed of a chamber 700A/700B where resin 702 is placed is such a way that UV light passes through the bottom glass plate 705, the optical diffuser 704A/704B, and the substrate 701 and irradiates the resin 702. Formation of a lens occurs inside the polymerization apparatus. The chamber 700A/700B holds and encloses the components required to achieve the polymerization except for the UV source 708. The top 711 and bottom 705 are glass plates or other appropriate transparent material. Within the chamber 700A/700B, a substrate 701 sits in a bed, table, grooved area or other supportive structure (not shown) and/or or may be held in place by clips, tabs or other fastening device (not shown) to the walls or extensions to the walls of chamber 700A/700 B. Resin 702 is poured in the concave part of the substrate 701. Curing radiation (that is, UV light) 709 is emitted from the light source 708 such as a spatial light modulator or illuminating system. The light source 708 may be a scanning laser or a DLP. Curing radiation passes through the bottom transparent plate 705 and is diffused by optical diffuser 704A/704B. Diffused light then propagates through the substrate 701 and enters the resin 702, where the lens 703 is formed.

In both embodiments of the polymerization apparatus shown in FIGS. 7A and 7B, the gaseous atmosphere and pressure inside the chamber 700A/700B is controlled through venting components including input/output pipes 706 and 707. These pipes direct nitrogen, oxygen, air, a mix of these gases and/or other gases into the interior of the chamber 700A/700B. These pipes may also be used to create a vacuum inside the chamber to degas the resin 702. The venting component includes valves and pumps as well as pipes 706 and 707 for the input and output of gases. The valves and pumps of the venting components and the light source are controlled by controller 710. The appropriate selection of gases depends on the resin formulation. For example, an acrylic resin with a 50% mix of monofunctional and bifunctional monomer and a mix of initiator at 0.5% and inhibitor at 1% can be used. In this example, as there is an inhibitor, oxygen is removed from the conditioning and reservoir apparatus 600 and will also be removed from the polymerization chamber 700A/700B by venting nitrogen into the chamber. Polymerization may be performed in a low-pressure nitrogen atmosphere to avoid the creation of bubbles within the polymerized lens 703.

In operation, as curing radiation enters the resin 702 through the glass plate 705, a polymerization front is created that separates the liquid resin 702 from the polymerized part that becomes lens 703. As polymerization proceeds, the polymerization front moves away from the substrate surface, and the growing lens thickens.

The irradiance pattern emitted by light source 708 used to create the formed lens 703 is computed using equation (1) (described above) and the BTDF of the diffuser 704, which provides the volumetric density of curing photons inside the resin. When the thickness of the formed lens 703 reaches the target value, the polymerization front will have the shape of the target surface, according to the optimization algorithm (8) (described above), the lens is completed, and the light source 708 is turned off.

In the embodiment shown in FIG. 7A, the diffuser 704A is flat and is located above and adjacent to the bottom 705. In the embodiment shown in FIG. 7B, the diffuser 704B is curved, having similar curvature of the convex side of the substrate 701. Further, in the embodiment shown in FIG. 7B, the diffuser 704B is located below and adjacent to the substrate 701. In one embodiment, the curved diffuser 704B may be constructed from transparent resin having light dispersing additives, such as calcium carbonate, glass, titanium. In some embodiments, the light dispersing additive has particles sized between 1 and 3 microns. It is preferable that the diameter of the diffuser 704A/704B is greater than or equal to the diameter of the substrate 701. That is, it is preferable that the diameter of the diffuser 704A/704B is not smaller than the diameter of the substrate 701.

In variations of these embodiments, the space between the substrate 701 and the diffuser 704A in the embodiment shown in FIG. 7A, or between the diffuser 701 and the bottom plate 705 in the embodiment shown in FIG. 7B, may be filled with a substance, preferably a liquid, to ensure index matching between the different surfaces to eliminate or reduce the reflection in these surfaces. This index matching liquid has the properties of being transparent and having a refractive index close to or matching that of the substrate and the diffuser. In one embodiment, when the substrate is CR-39® and acrylate is the diffuser, the index matching fluid glycerin (having a refractive index of 1.47) may be used.

In some embodiments, the upper window glass 711 is removed.

In some cases, the diffuser of FIG. 7A is substituted with curved diffuser 532, such as shown in FIG. 5D. In this case, diffuser 704B may be diffuser 532.

Figure 8:
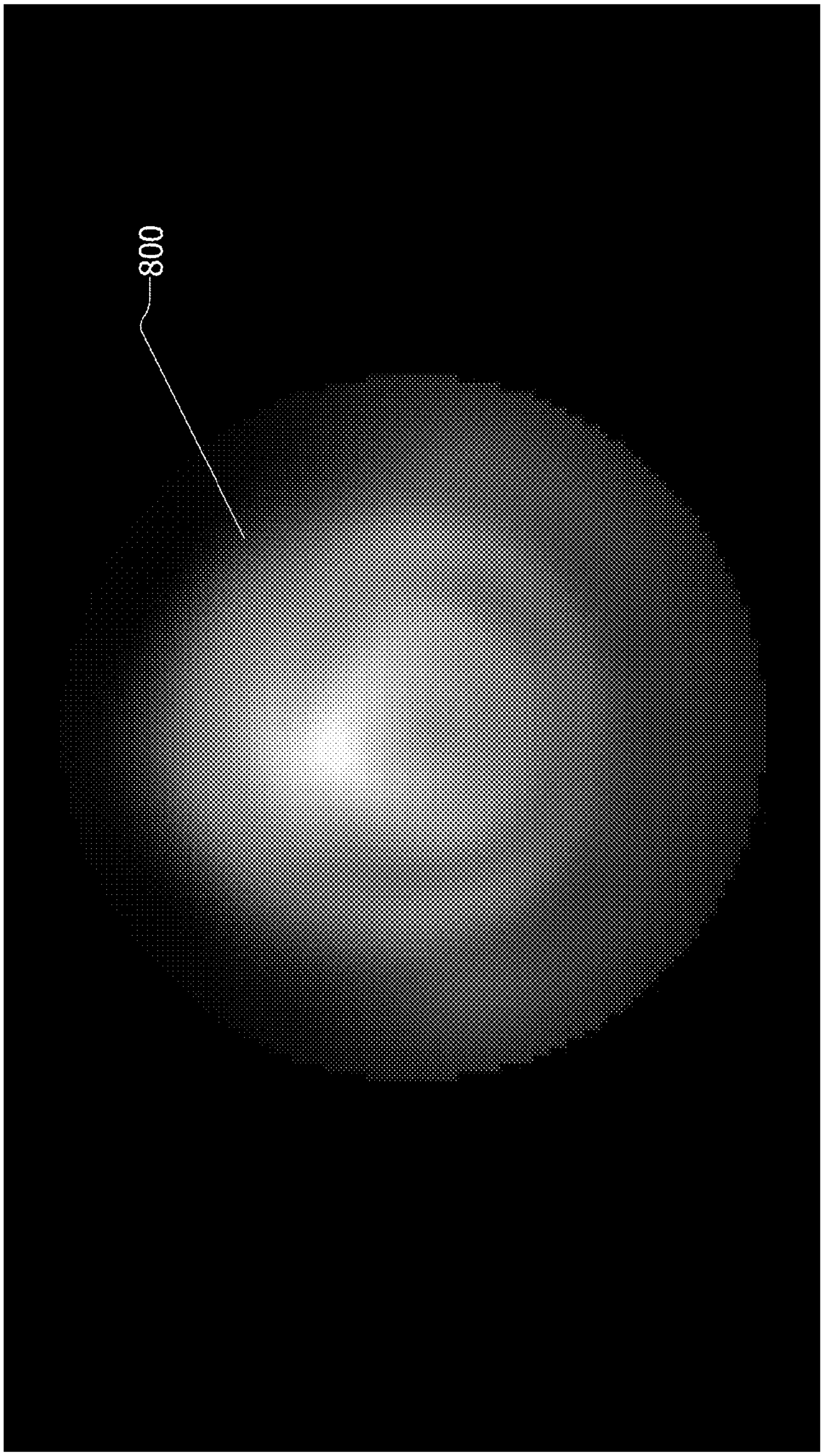
FIG. 8 is an image showing an input irradiance pattern.
Figure 9:
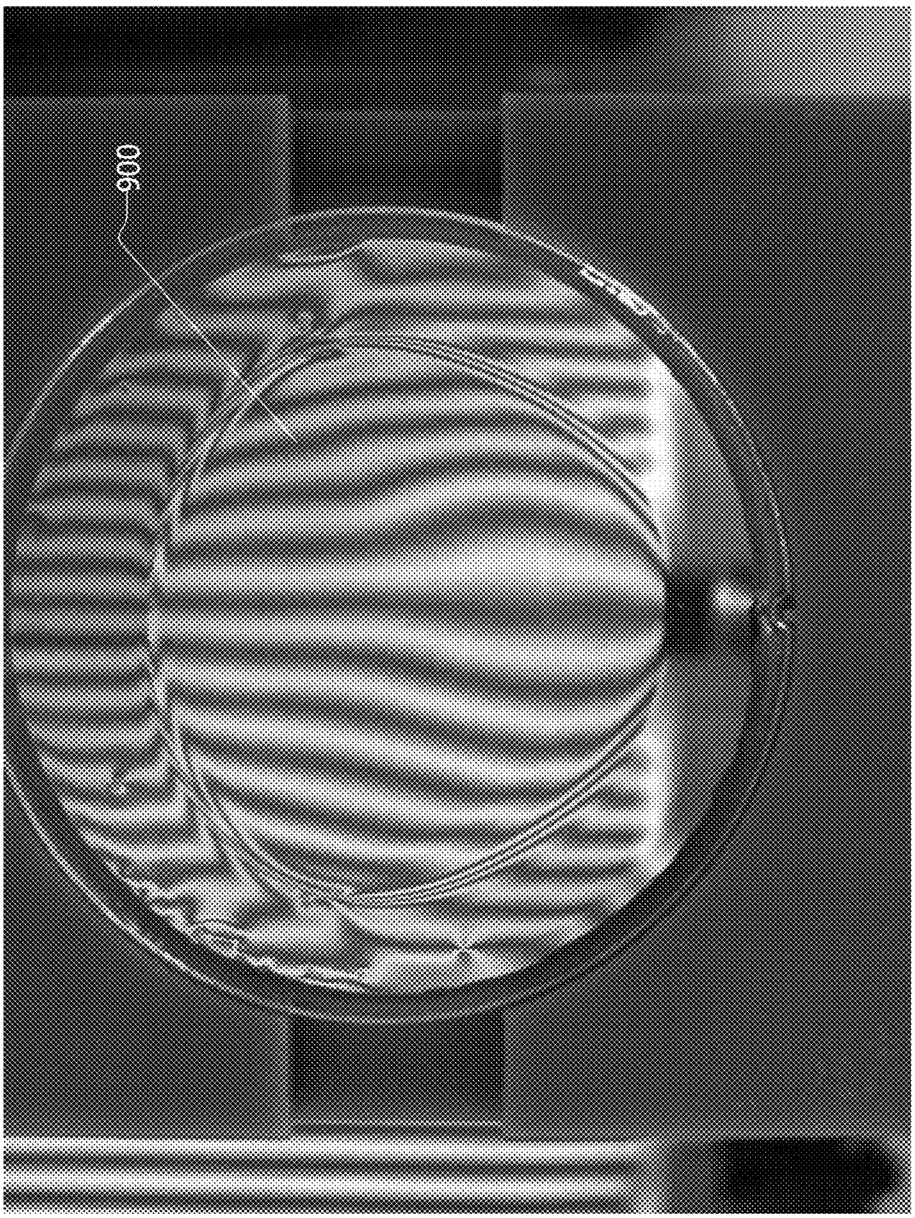
FIG. 9 is an image showing deflection of fringe patterns.

Referring now to FIG. 8, an example of a possible input light pattern 800 applied via the polymerization apparatus shown in FIG. 7A is shown. This pattern may be projected for 60 seconds, or other appropriate time, to produce a polymerization front with varying curvature to create lens 703 as a progressive addition lens. Referring now to FIG. 9, the lens 900 resulting from application of the methods described herein using the polymerization apparatus shown in FIG. 7A with the input pattern shown in FIG. 8 is shown.

Metrology Apparatus

Figure 10:
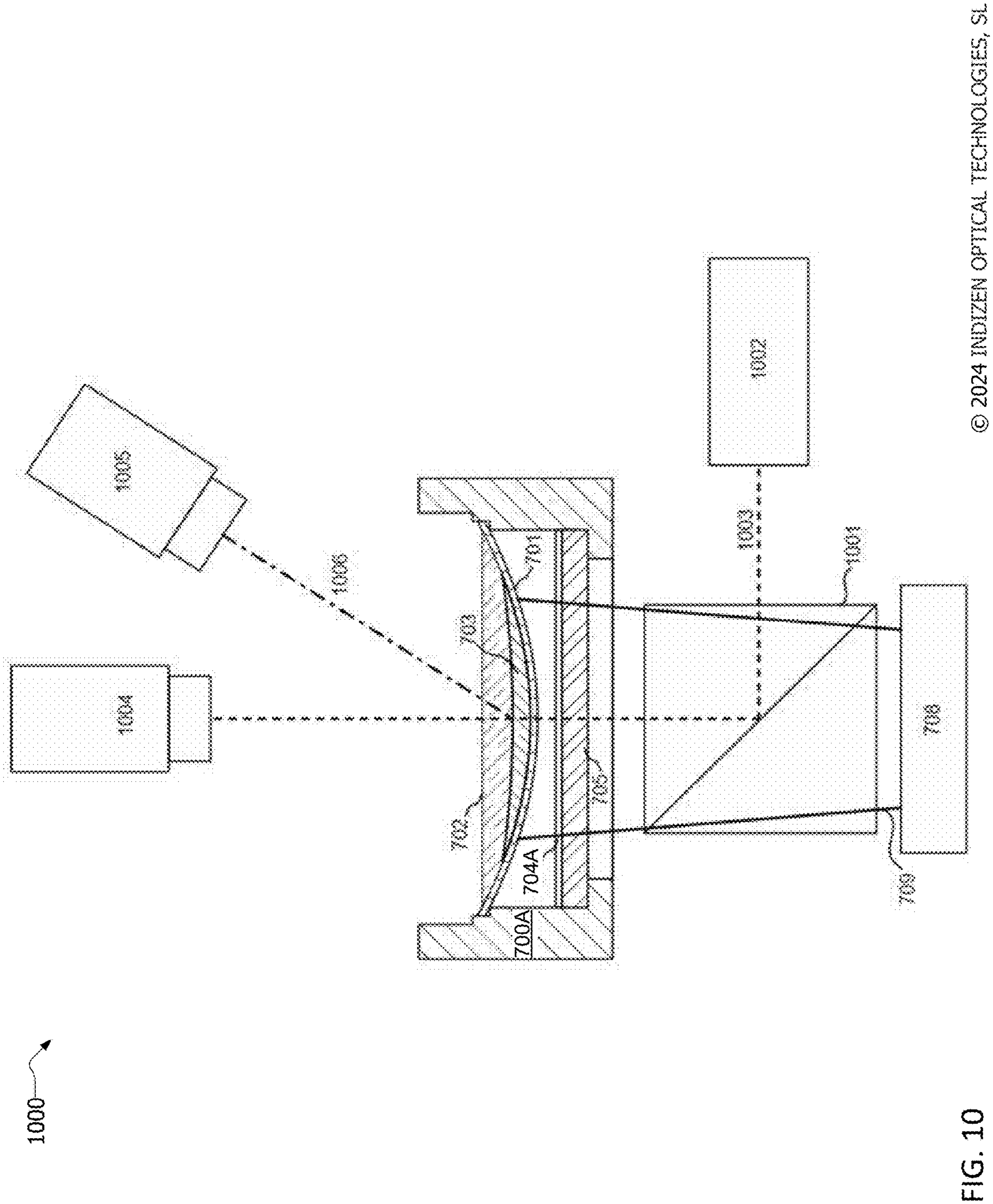
FIG. 10 is a schematic drawing showing an exemplar metrology apparatus.

An additional module can be attached to the polymerization apparatus shown in FIGS. 7A and 7B to make real time measurements and to provide feedback to correct or improve the light input pattern during the polymerization process. Referring now to FIG. 10, an embodiment of a metrology apparatus 1000 is shown. Included in the metrology apparatus 1000 is the polymerization apparatus shown in FIG. 7A. In this embodiment, the polymerization apparatus from FIG. 7A is used without the upper glass 711. The metrology apparatus 1000 includes a thermal camera 1005 to monitor in real time the temperature distribution of the resin 702 by sensing thermal radiation 1006 in the resin 702. As polymerization is an exothermic reaction, the light input pattern, which is spatially dependent, produces a higher rate of polymerization where it provides a higher photon density. Accordingly, the light input pattern, the shape of the polymerization front over time, and temperature distribution in the resin are correlated. Unexpected variations in the temperature distribution in the resin will similarly correlate with lack of homogeneity of the resin, with the presence of gel-type precipitates, or other impurities. To use a thermal camera 1005, the top glass plate of the polymerization chamber is removed as it is opaque to thermal radiation 1006.

In some embodiments, the metrology apparatus 1000 includes an additional secondary system is used to monitor the shape of the polymerization front as it evolves during the polymerization process. This secondary system evaluates topography with ultrasonic waves.

Referring again to the metrology apparatus 1000 in FIG. 10, an optical system is depicted using camera 1004. Camera 1004 uses low-wavelength light that cannot polymerize the resin to evaluate the formation of the lens and/or the polymerization front. For example, the camera 1004 may use red light with a wavelength of 635 nm, or near-infrared light with a wavelength of 780 nm. The camera 1004 may use light having other wavelengths that do not interfere with polymerization of the resin. In one embodiment of the metrology apparatus, a projector of structured light projects fringe patterns to shine structured low-wavelength light from above to the resin 702, and a camera 1004 images the light reflected from the polymerization front. The polymerization front reflects due to the variation of refractive index between the liquid resin and the polymer.

The metrology apparatus 1000 may include, additionally or alternatively, a light source 1002 such as a spatial light modulator or illuminating system to send structured low-wavelength light beam 1003 from below. This may be accomplished by transmission of a measuring light beam 1003 through the lens 703 which is detected with camera 1004. In this embodiment, the measuring light beam 1003 and the curing light 709 are mixed by a beam-splitter 1001, for example a dichroic beam-splitter that will not affect the amount of curing light projected.

Other embodiments of the metrology apparatus 1000 may include other or additional sensors, such JR cameras, ultrasound sensors, and others.

Resin Drainage Apparatus

After the lens has been formed by the polymerization apparatus, remaining resin may be drained and reused. More specifically, after the polymerization apparatus has completed the target shape and formed the lens with the target thickness, the projector is turned off and projection of the input pattern stops. The substrate containing the lens and remaining non-polymerized resin are then removed from the polymerization apparatus. This can be achieved manually or using an automated system. After the lens is completed, the remaining liquid resin is removed or otherwise drained from the polymerization apparatus to avoid unwanted polymerization of the resin.

Figure 11:
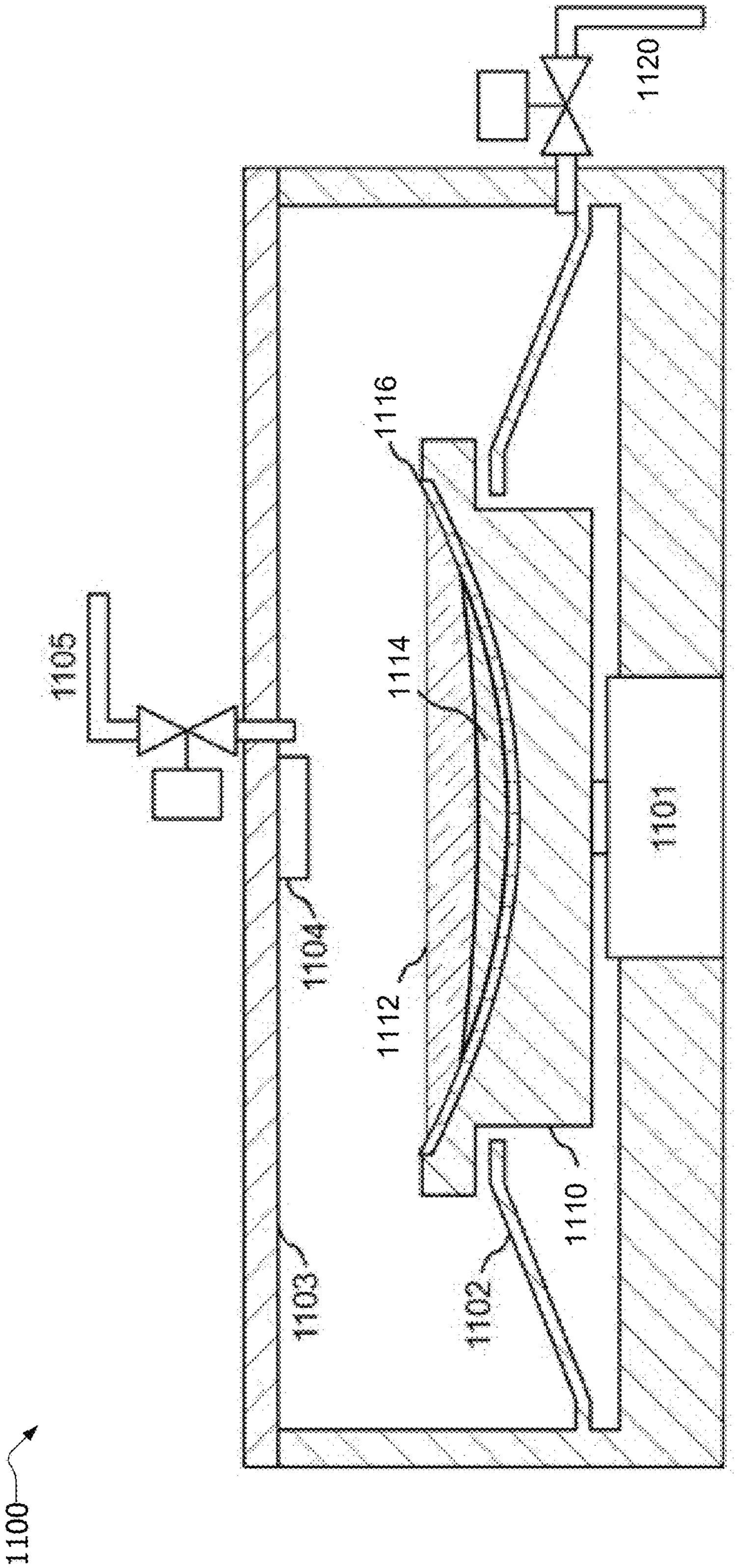
FIG. 11 is a schematic drawing showing an exemplar resign drainage apparatus.

Referring now to FIG. 11, an exemplary resin drainage apparatus 1100 is shown. The substrate 1116 with the formed lens 1114 and remaining liquid resin 1112 are placed and firmly attached to a base 1110 and placed on a spinning machine 1101. The base 1110, substrate 1116, lens 1114 and remaining resin 1112 are rotated by spinning machine 1101.

The centrifugal force moves the remaining liquid resin away and off the lens 1114 and substrate 1116, and into the receptacle formed by a cone-shaped shelf 1102. The speed of the spinning machine 1101 along with the viscosity of the resin 1112, which in turn is largely dependent on the temperature, determines the amount of resin remaining on the lens. The cover 1103 blocks resin from flying out of the resin drainage apparatus 1100. The resin collected by the spinner on top of the cone-shaped shelf 1102 is recovered with drain pipe 1120 to be recycled and reused as described (above) regarding FIG. 6. The collection of remaining resin for recycling and reuse can be done automatically, the resin being pumped from drain pipe 1120 from the resin drainage apparatus 1100 of FIG. 11 to the system of FIG. 6.

When the volume of remaining resin is large, excess resin can be dumped before spinning by tilting the substrate. For those resin formulations in which the amount of gelified resin is too large, the remaining resin can be discarded, and appropriate solvents can be used to remove the non-cured resin from the substrate-lens pair.

In another embodiment, after the resin has drained through pipe 1120, a precure of the thin layer of liquid resin remaining on top of the lens surface can be achieved via a diffuse UV light source 1104 such as a spatial light modulator or illuminating system included on the underside of the cover 1103. According to this embodiment, when this layer is precured, a small amount of liquid hard coating lacquer can be poured on the lens via applicator 1105 which may be integrated into the cover 1103. The lacquer can be spun off by an additional rotation cycle of the spinning machine 1101, leaving a uniform layer than can be further photocured or thermally cured by means of heaters (not shown) that may be included in resin drainage apparatus 1100.

Post-Curing Apparatus

Figure 12:
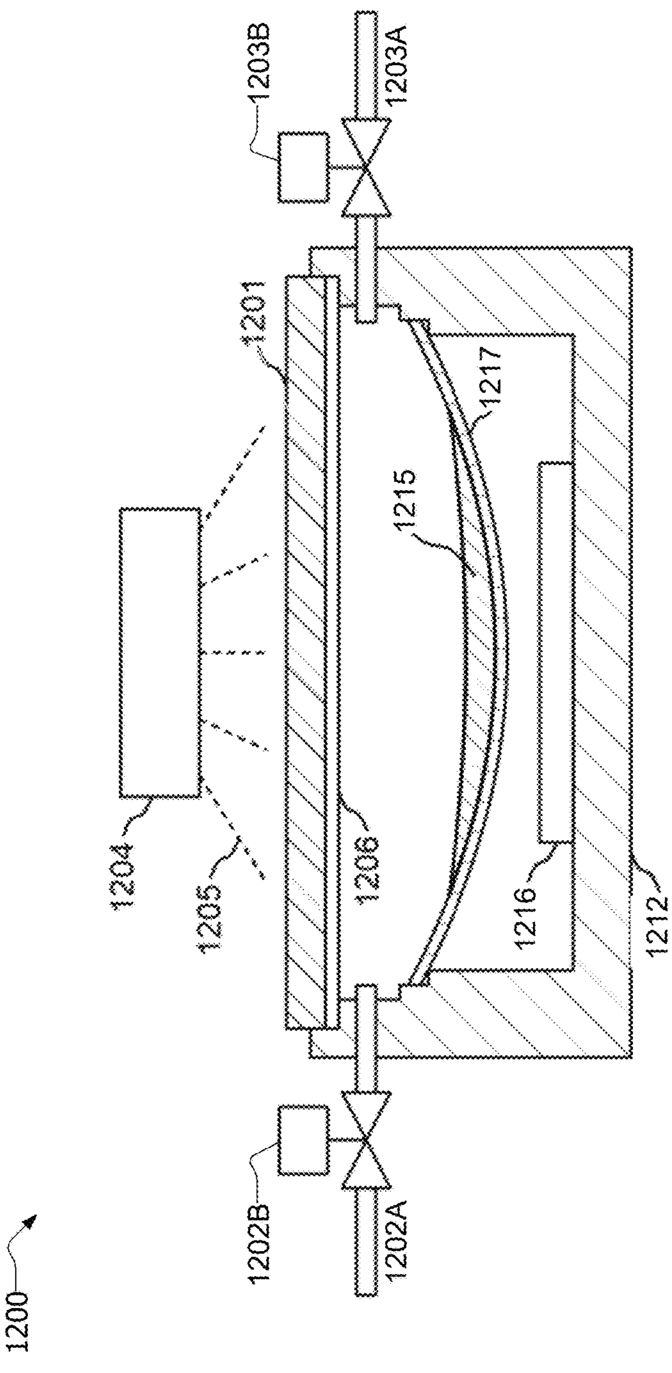
FIG. 12 is a schematic drawing showing an exemplar post-curing apparatus.

Depending on the formulation and properties of the resin and related process parameters for a particular lens, post curing actions may be performed. Referring now to FIG. 12, an embodiment of a post-curing apparatus 1200 is shown. The post-curing apparatus 1200 may be used after remaining liquid resin has been drained in the spinner-type resin drainage apparatus 1100 of FIG. 11. In some embodiments, the resin drainage apparatus 1100 does not incorporate UV sources and/or thermal sources, so the film of liquid resin left on top of the formed lens after performing actions using the resin drainage apparatus 1100 must be cured using another apparatus. In particular, the resin drainage apparatus 1100 may lack a venting system that would provide oxygen-free atmosphere. In that case, the thin layer left on top of the lens cannot be cured, as it is a few microns thick and oxygen is continuously diffusing from the atmosphere. In that case, an additional apparatus may be needed, a post-curing apparatus.

Referring to FIG. 12, the post-curing apparatus 1200 includes a chamber 1212 into which the substrate 1217 and the lens 1215 are placed with a sealed lid 1201 transparent to UV radiation. Input and output pipes 1202A and 1203A are included through the walls of the chamber 1212 with control valves 1202B and 1203B to allow for the maintenance and control of the appropriate atmosphere (that is, gaseous mix) within the chamber 1212. Depending on the resin, a neutral nitrogen atmosphere may be used at high pressure to avoid bubble formation on the lens 1215. If the resin is properly degassed, low pressure nitrogen or a vacuum can be used to expel the oxygen from the resin. After the atmosphere within the chamber 1212 and the lens 1215 are free from oxygen, a source 1204 of curing radiation 1205 (for example, an illuminating system, or a UV light source such as a spatial light modulator) is activated to cure the remaining layer on the lens 1215. Heaters 1216 may optionally be included and integrated with the bottom of the chamber 1212. The heaters 1216 may be used to improve mobility of the non-reacted monomer inside the polymer matrix and increase the degree of conversion c (see Equation 5 above).

A diffuser 1206 may be incorporated in the lid 1201 to homogenize the irradiance 1205 reaching the thin layer of liquid resin on the lens 1215 from the light source 1204 such as a spatial light modulator or illuminating system.

Output Product—A Lens

The output product of the systems and methods described herein is a lens, namely a substrate/formed-lens composite. In some cases, the formed lens will be detached from the substrate and the formed lens will be the final lens. In other cases, the formed lens will not be separate from the substrate, such that the two components together form the eyewear lens. In this second case, the eyewear lens might have some optical properties inherited from the substrate. For example, the substrate can be polarized, tinted or photochromic, so long as a sufficient amount of curing radiation can pass through the substrate to polymerize the forming lens. The substrate may also incorporate an antireflective coating or hard coating on its convex surface. Further, the substrate may provide power. Combining a substrate with the formed lens provides great advantages as it allows to for the production of spectacle lenses not limited to the optical properties of the polymerized resin.

In another embodiment the formed lens is detached from the substrate. The resulting product is the formed lens entirely of polymerized resin. The advantage of this embodiment is that the substrate can be reused.

The Method

Figure 13A:
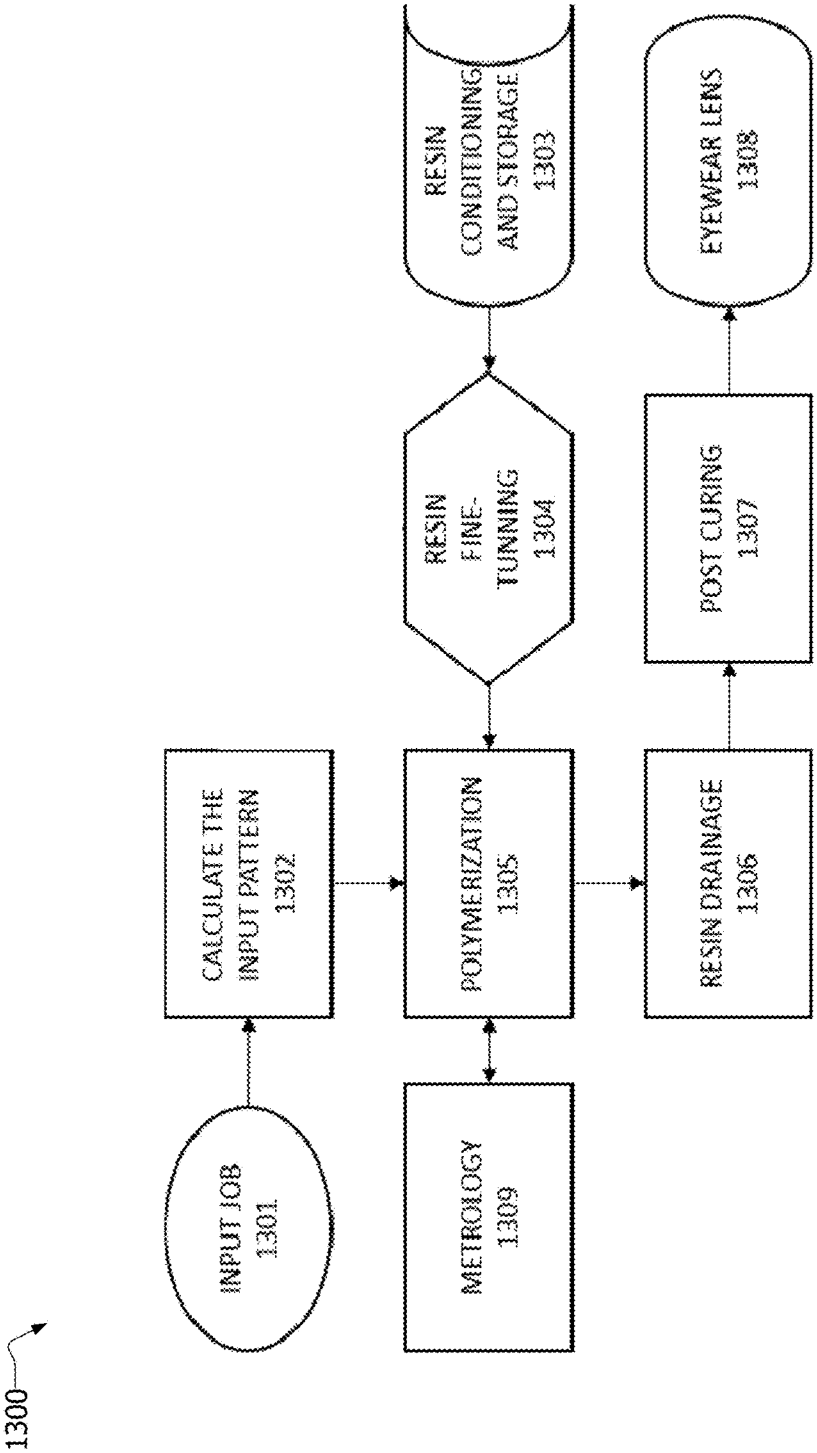
FIG. 13A is a flow chart showing the actions taken to form a lens using the systems and methods described herein.

Referring now to FIG. 13, the method 1300 used to produce a spectacle lens using the apparatuses and methods described herein is shown. Method 1300 may be performed by or as part of a system or process described herein. Referring to block 1301, an input job is received. The input job includes information required for manufacturing a lens, including: geometry of the free-form surface, expected or preferred thickness, geometry of the fixed surface, expected or desired refractive index, lens diameter or contour shape, user parameters, user lifestyle parameters, and others. The input job specification may include some or all of the information listed. As used in the input job, user parameters include nasopupilar distance; frame properties such as frame pantoscopic, wrapping angle, frame vertex distance; fields of view; reading distance; working distance; age; health; and other parameters. As used in the input job, user lifestyle may be specification of the primary activity or activities of the user, including sports—outdoor, indoor, a specific sport such as swimming and running—driving, reading, desk job, and/or a career, such as, for example, chef, teacher, lawyer, bus driver, etc.

As part of block 1301, upon receipt of the input job an eyewear lens, a lens substrate used to create an eyewear lens may be selected. Selecting the lens substrate may include selecting based on or using data of the input job. In some cases, this lens is called a blank lens substrate, but to avoid confusion with standard blanks used in free-form, the use of "blank" will be avoided to describe a substrate according to the disclosed technology.

Prior to block 1301, an eyewear lens flat or curved diffuser system used to create an eyewear lens may be selected. The containment system may be one capable of producing a lens using data of the input job. The systems described in FIGS. 5D and 5I are possible embodiments of the technology for the improved light pattern system. The selected system may be a machine that does not change upon the reception of the job at block 1301. Selection of the job at block 1301 may include selecting the base curve of the substrate, but not selecting different containment methods, or selecting different light sources such as a spatial light modulator, illuminating system or improved light pattern. The containment methods, light sources such as a spatial light modulator or illuminating system and light patterns may be fixed once the diffuser system machine is selected.

The lens substrate, improved light pattern system and/or curved diffuser system may include those described above for FIGS. 5A-5I.

Upon receipt of the input job and/or selection of the containment system, lens creation instructions are determined. The lens creation instructions (or requirements) include an input pattern for UV light and a resin composition. The irradiation pattern or input pattern is calculated (as shown in block 1302) such that the polymerization front for a given exposure time coincides with the desired geometry of the free-form lens surface, substrate and/or containment system. This calculation of the input pattern consists of an optimization process for every point inside the resin to be irradiated by multiple points from the diffuser.

The creation instructions or improved light pattern may be calculated based on the input information, the selected substrate, the selected diffuser and a resin composition. The creation instructions may include an irradiation pattern that is or has an improved light pattern for irradiating the flat or curved diffuser such as diffuser 532. The input pattern calculated for the light at 1302 may be or include an irradiation pattern that is or has an improved light pattern formed using calibration techniques for dynamic light patterns with respect to space and time, where the irradiation patter is such that each point in the resin is illuminated by light from at least 10% of the locations on the diffuser.

Specifically, the calculation begins with the lens surface specified in the input job, substrate and/or containment system. The input pattern of light is calculated such that the polymerization front after a time "t" coincides with the objective surface including evaluation of the following.

a. The diffuser receives the directional light of an improved light pattern from the light source such as a spatial light modulator or illuminating system; and each point of the diffuser emits in each direction according to its BTDF function.
b. Each point in the resin receives light from multiple source locations in the diffuser.
c. The light received by the resin initiates the photochemical reactions described in Equation 1.
d. The photochemical reactions change the degree of conversion pursuant to Equation 5 at each point in the resin.
e. The polymerization front is defined as the points inside the resin that reach a degree for conversion c equal to the critical conversion value.

During the calculation (1302), resin composition is also determined such that the creation instructions include the irradiation pattern and resin composition. The resin composition defines the composition of the resin. The calculation (1302) also determines the amount of liquid resin that will be needed to create the formed lens with the needed diameter. The composition of the resin includes particular amounts of photo-initiator and inhibitor (optional) depending on the information in the input job. For example, lenses with greater thickness might require less light absorption which is obtained with less photo-initiator or a larger amount of inhibitor. This is why the creation instructions include determination of both the irradiation pattern and the resin composition. Then, resin is conditioned and stored according to the procedure described above regarding FIG. 6 (as shown in block 1303). The composition of the resin can be adjusted to meet the requirements of the creation instructions by changing the concentration of photo-initiator and/or inhibitor.

Next, polymerization is performed (as shown in block 1305). The polymerization begins with placing a new clean (e.g., the selected) substrate and/or (e.g., the selected) diffuser in the polymerization chamber, followed by pouring the resin (according to block 1304) into the polymerization chamber or onto the substrate. The polymerization continues with radiating the diffuser with the input pattern or an improved light pattern that provides the correct photon density distribution within the resin to achieve the lens surface specified in the input job according to the irradiation pattern in the creation instructions. During the polymerization (1305), the information from the metrology apparatus may be used to adjust and/or correct the input patterns (as shown in block 1309).

Once the formed lens is created in the polymerization chamber, if needed, the resin is drained from the polymerization chamber (as shown in block 1306), resulting in an object composed of the substrate and the formed lens covered by a gel layer.

During post-curing (as shown in block 1307), the gel layer is polymerized. The formed lens may then be detached from the substrate. The result is an eyewear lens (as shown in block 1308). In some embodiments, when the formed lens is not detached from the substrate, the output product is the composite of the substrate and the formed lens. In some embodiments, the formed lens includes the substrate, and the output product is the composite of the substrate and the formed lens. In some embodiments, the formed lens includes the substrate and a resin containment system; and the output product is the composite of the substrate, the formed lens, and the containment system. In some embodiments, after forming the lens, the containment system is removed or cut away. In this case, the formed lens includes the substrate; and the output product is the composite of the substrate, and the formed lens, after the containment system is removed or cut away.

After removal, the formed lens or output product may be cut before placing the lens in a frame for wearing. Other actions may be taken on the formed lens, such as applying an antireflective coating or hard coating.

Figure 13B:
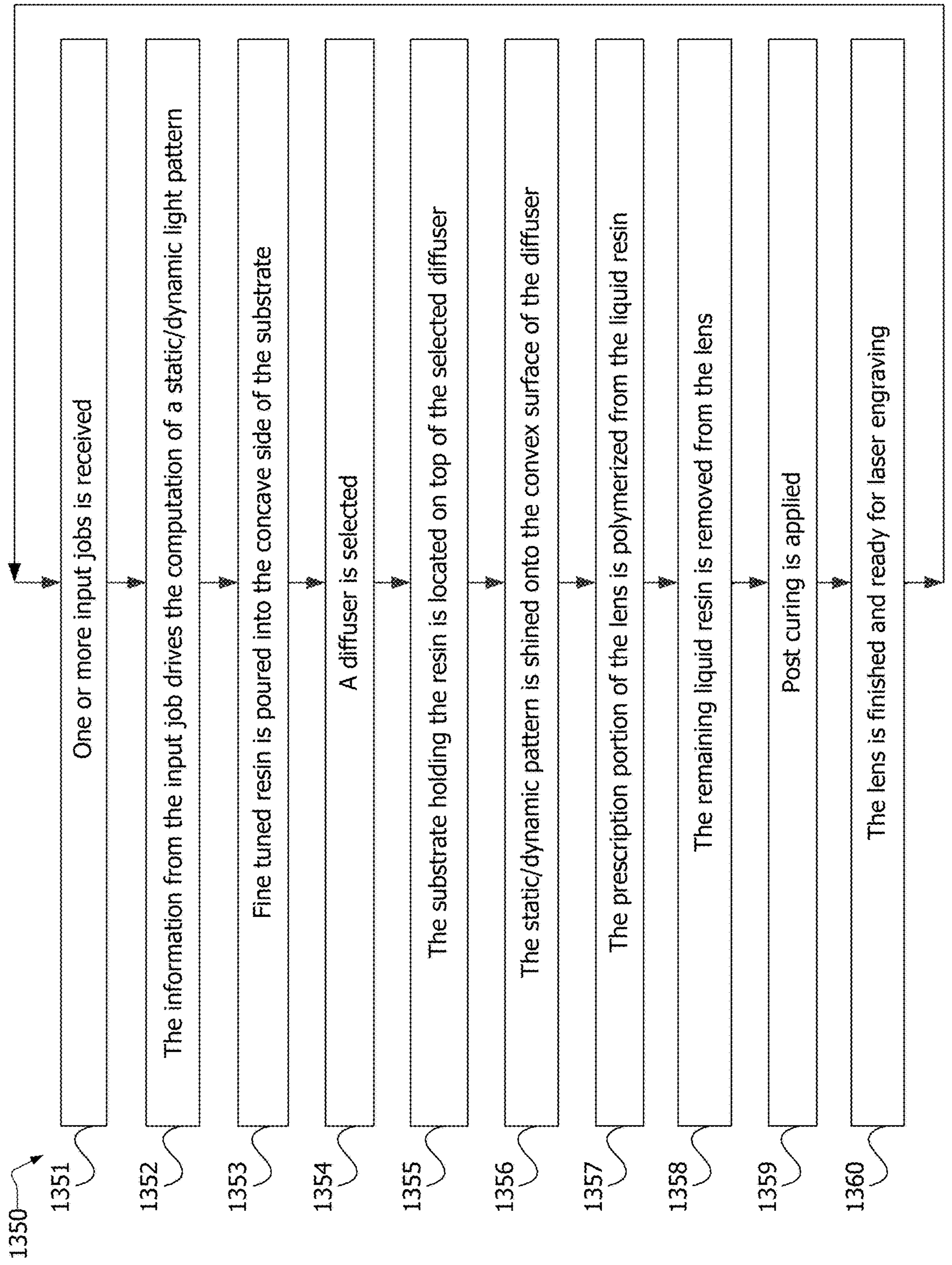
FIG. 13B is a flow chart showing the actions taken to form a lens using the systems and methods having improved light patterns.

FIG. 13B is a flow chart showing the actions 1350 taken to form a lens using the systems and methods having improved light patterns. Actions 1350 may be a process or method used to produce a spectacle lens using the apparatuses and/or methods described herein. Actions 1350 may be performed by or as part of a system or process described herein.

At block 1351, one or more input jobs is received. Receiving an input job at block 1351 may be similar to block 1301. The input jobs (and all the associated info) may allow a system or software to select an optimal base curve and the ideal free-form surface to get optimal visual quality according to the input job parameters.

At block 1352, the information on base curve and free-form surface from block 1351 drives the computation of a static/dynamic light pattern that will produce the required surface within the resin. This light pattern may be an improved light pattern calculated based on the input job, such as using the optimal base curve and the ideal free-form surface to get optimal visual quality according to the input job parameters. The improved light pattern may be for irradiating the flat or curved diffuser such as diffuser 532. The improved light pattern may be formed using calibration techniques for dynamic light patterns with respect to space and time, where the irradiation patter is such that each point in the resin is illuminated by light from at least 10% of the locations on the diffuser.

At block 1353, fine tuned resin is poured into the concave side of the substrate. The fine-tuned resin may be conditioned resin, such as resin that has been prepared, tuned, or conditioned for successful printing into a lens. Here, the system may use some resin containment technology, as self-containing aspheric substrates, substrates with cylindrical walls, or substrates on which walls are constructed by some additive technology as fused deposition modeling (FDM). FDM may use a printing head to produce a containment wall just over the concave surface edges of the substrate. FDM may also be known as fused filament fabrication (FFF).

At block 1354, a diffuser is selected, preferably with the same curvature as the front surface of the substrate. The diffuser may be curved or flat.

At block 1355, the substrate holding the resin is located on top of the selected diffuser. In some cases, at block 1355 the selected diffuser is located just below the convex side of the substrate.

At block 1356, the static/dynamic pattern is shined onto the convex surface of the diffuser. This may be shining an improved light pattern as described herein onto the convex surface.

At block 1357, the prescription portion of the lens is polymerized from or of the liquid resin. This polymerized part is attached to the substrate. It may stay on the substrate or be subsequently removed from the substrate.

At block 1358, the remaining liquid resin is removed from the lens just created. This removing may be done either by spinning it out or by gravity pouring.

At block 1359, post curing is applied.

At block 1360, the lens is finished and ready for laser engraving.

Actions 1350 may include metrology performed just after polymerization at block 1357 (and optionally before block 1358). In other cases, metrology is performed after block 1359 as it may be much easier to measure the lens after post curing.

Any blocks of action 1350 may include descriptions of corresponding blocks of process 1300 or other corresponding descriptions herein.

In some cases, descriptions herein are for methods, processes and/or systems of lens creation by layerless additive manufacturing using improved light patterns. Layerless additive manufacturing may be or include using a light source or improved light source as described herein to create a lens, such as without using multiple exposures to light from the light source, without forming multiple layers of the lens or without illuminating the resin with light more than once. Layerless additive manufacturing may be or include using a light source or improved light source as described herein to create a lens using a spatial light modulator or illuminating system for illuminating the resin with the curing radiation so that the curing radiation first passes through a diffuser, then the substrate, then enters the resin to create a layerless polymerized lens during a single illumination of the curing resin by the curing radiation.

The methods, processes and/or systems herein may include a substrate at least partially transparent to a curing radiation having an improved light pattern; a photocurable resin on top of the substrate; and the spatial light modulator or illuminating system for illuminating the resin with the curing radiation so that the curing radiation first passes through a diffuser, then the substrate, then enters the resin to create a layerless polymerized lens during a single illumination of the curing resin by the curing radiation. The improved light pattern may be such that each point in the resin is illuminated by light from a set of points in the diffuser covering at least 10% of a total area of a surface of the diffuser towards the substrate. The improved light pattern may be improved and optimized to compensate for at least one of: distortion generated by the spatial light modulator or illuminating system, a distortion effect of using curved diffusers, a variability of the spatial response of the light modulator or illuminating system, or for a lack of linearity of the irradiance response of the spatial light modulator or illuminating system. The improved light pattern may change over time while the improved light pattern is projected onto the diffuser surface further away from the substrate.

The methods, processes and/or systems for creating a spectacle lens using an improved light pattern techniques described herein may be implemented and stored as software on a machine readable storage media in a storage device included with or otherwise coupled or attached to a computing device. That is, the software may be stored on electronic, machine readable media. These storage media include magnetic media such as hard disks, optical media such as compact disks (CD-ROM and CD-RW) and digital versatile disks (DVD and DVD±RW); and silicon media such as solid-state drives (SSDs) and flash memory cards; and other magnetic, optical or silicon storage media. As used herein, a storage device is a device that allows for reading from and/or writing to a storage medium. Storage devices include hard disk drives, SSDs, DVD drives, flash memory devices, and others.

The method, processes and/or systems for creating a spectacle lens using an improved light pattern techniques described herein may be implemented on a computing device that includes software and hardware. A computing device refers to any device with a processor, memory and a storage device that may execute instructions including, but not limited to, personal computers, server computers, computing tablets, smart phones, portable computers, and laptop computers. These computing devices may run an operating system, including, for example, variations of the Linux, Microsoft Windows, and Apple MacOS operating systems.

By providing data and instructions associated with the control and processing of the methods, processes and/or systems for creating a spectacle lens using an improved light pattern techniques described herein, those data and instructions increase computer efficiency because they provide a quicker, automated and more accurate optimizing the methods and/or process for creating a spectacle lens using an improved light pattern technique or system, as well as other advantages and benefits described herein. They, in fact, provide better methods, devices, lenses, containment system and computer instructions for creating a spectacle lens using an improved light pattern technique or system.

Closing Comments

Throughout this description, the embodiments and examples shown should be considered as exemplars, rather than limitations on the apparatus and procedures disclosed or claimed. Although many of the examples presented herein involve specific combinations of method acts, apparatuses, components or system elements, it should be understood that these may be combined in other ways to accomplish the same objectives. With regard to methods, processes and flowcharts, additional and fewer actions may be taken, and the actions as shown and described may be combined or further refined to achieve the methods described herein. Acts, components, apparatuses, elements and features discussed in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for lens creation by layerless additive manufacturing using improved light patterns, the system comprising:

a substrate at least partially transparent to a curing radiation having an improved light pattern;

a photocurable resin on top of the substrate;

a spatial light modulator for illuminating the resin with the curing radiation so that the curing radiation first passes through a diffuser, then the substrate, then enters the resin to create a layerless polymerized lens during a single illumination of the curing resin by the curing radiation;

wherein:

the improved light pattern is such that each point in the resin is illuminated by light from a set of points in the diffuser covering at least 10% of a total area of a surface of the diffuser towards the substrate; and one of:

the improved light pattern of the curing radiation is improved and optimized to compensate for at least one of: distortion generated by the spatial light modulator, a distortion effect of using curved diffusers, a variability of the spatial response of the light modulator, or for a lack of linearity of the irradiance response of the spatial light modulator; or the improved light pattern changes over time while the improved light pattern is projected onto the diffuser surface further away from the substrate.

2. The system of claim 1, wherein:

a spatial light modulator is further projecting the improved light pattern to shine over at least 15% of the total area of the diffuser; and further comprising:

a resin removal system to remove a portion of the resin further away from the substrate than the diffuser that has not been polymerized by the curing radiation once the light pattern is turned off, and a resin hardening system to harden a resulting gel-state surface of the resin separating the polymerized lens and non-polymerized parts of the resin.

3. The system of claim 1, wherein the diffuser is a curved diffuser that has a curved front surface that is parallel to a curved back surface of the curved diffuser, and the front and back surfaces both have a curvature that is the same as a curvature of a front surface of the substrate holding the resin in which the lens is formed.

4. The system of claim 1, wherein the curved diffuser has a geometry where the height of a center point of the diffuser is in a range of between 0.5 and 15 mm in height below the height of the edges, and wherein the space between the diffuser and the substrate, measured along the optical axis of the diffuser is smaller than 10 mm.

5. The system of claim 1, wherein the improved light pattern has an irradiance distribution through space that may change with time, and that upon impinging on the curved diffuser will produce a polymerization front within the resin to match a target lens surface after an irradiance time t.

6. The system of claim 1, wherein the spatial light modulator acts as a light source that is a pixelated light source having pixels, wherein each pixel is a light emitter that can be independently controlled.

7. The system of claim 6 where the spatial light modulator acting as light source is one of: a digital light processing projector using a DMD (digital micro-mirror device), a digital light processing projector projecting a liquid crystal display (LCD) spatial modulator, a liquid crystal on silicon (LCOS)-based spatial light modulator, or a back-illuminated LCD panel.

8. The system of claim 6, wherein the irradiance distribution is spatially calibrated by taking into consideration a flatness or curvature of the curved front and back surfaces of the curved diffuser; and wherein the irradiance distribution is irradiance calibrated to have a calibrated response that is linear and varies between a non-zero-level irradiance minimum value and a maximum irradiance delivered by the light source for each of the pixels.

9. The system of claim 6, wherein the irradiance distribution is spatially or irradiance calibrated using an irradiance pattern that changes with spatial coordinates but does not change during a period of time.

10. The system of claim 6, wherein the irradiance distribution is spatially or irradiance calibrated using an irradiance pattern that changes with spatial coordinates and changes during a period of time.

11. The system of claim 10, wherein the irradiance distribution is irradiance calibrated spatially using an irradiance pattern having the pixels that one of a) the pixels are each given a binary response (on/off) and the pattern starts with all the pixels off, then pixels providing higher exposure are turned on before those pixels providing lower exposure are turned on;

b) the pixels are each given a binary response (on/off) and the pattern starts with all pixels on, then the pixels providing lower exposure are turned off before those pixels providing higher exposure are turned off;

c) the pixels are each given a binary response (on/off) and each of the pixels is turned on and off in such a way that the total time they are "on" times the irradiance in the "on" state provides a desired exposure for each pixel;

d) the pixels are each given a continuous response and each of the pixels is switched "on" and "off" in such a way that if $t_i$ are the intervals of times a given pixel is turned on, and $I_i$ are the corresponding irradiances of that given pixel for each interval of time $t_i$, an expected exposure for each of the pixels is the sum of all the products $t_i \times I_i$; or e) the pixels are each turned on and off at the same time, each of the pixels is turned on for an irradiance time t that will produce a polymerization front within the resin to match a target lens surface after the irradiance time t and the irradiance of each of the pixels is set such that the product of such irradiance by time t equals the an expected exposure for each of the pixels.

12. The system of claim 1, wherein the light source is a beam scan light source emitting a single light beam forming a relatively small spot at an output plane, and having a scanning system that deviates the beam and scans the spot over the output plane to form an irradiance distribution.

13. The system of claim 12, wherein the irradiance distribution is spatially calibrated by taking into consideration a flatness or curvature of the curved front and back surfaces of the curved diffuser; and wherein the irradiance distribution is irradiance calibrated using one of: raster, circular or random scanning of the spot over the curved diffuser.

14. A system for lens creation using improved light pattern techniques comprising:

a polymerization apparatus to create a formed lens by transmitting light according to an irradiation pattern;

a light source to transmit the irradiation pattern onto and through a diffuser located in a chamber containing resin on a substrate, wherein the irradiation pattern includes an improved light pattern formed using calibration techniques for dynamic light patterns with respect to space and time, wherein the irradiation pattern is such that each point in the resin is illuminated by light from at least 10% of the locations on the diffuser.

15. The system of claim 14, wherein the improved light pattern:

has dynamic light patterns with respect to space and time;

illuminates each point in the resin by light from at least 10% of the locations on the diffuser;

takes into consideration a curvature of the substrate; and has temporal patterns for which the pixel response is not monotonically growing.

16. The system of claim 14, wherein the diffuser is a curved diffuser that has a curved front surface that is parallel to a curved back surface of the curved diffuser, and the front and back surfaces both have a curvature that is the same as a curvature of a front surface of the formed lens; and wherein the curved diffuser has a geometry where the height of the middle/center point of the diffuser is in a range of between 0.8 and 14.5 mm in height below the height of the edges.

17. The system of claim 14, wherein the irradiation pattern has an irradiance distribution that, upon impinging on the diffuser, will produce a polymerization front to match a target lens surface after an irradiance time t.

18. The system of claim 14, wherein the irradiance distribution is spatially calibrated by taking into consideration a flatness or curvature of the front and back surfaces of the diffuser; and wherein the irradiance distribution is irradiance calibrated using one of: raster, circular or random scanning of the spot over the diffuser.

* * * * *